United States Patent [19]

Yang et al.

[11] Patent Number: 5,481,538
[45] Date of Patent: Jan. 2, 1996

[54] FRAME REMOVAL MECHANISM FOR TOKEN RING NETWORKS USING ONE OR MORE START STRIP DELIMITER FRAMES OR CIRCULATION TIME INTERVAL

[75] Inventors: Henry S. Yang, Andover; K. K. Ramakrishnan, Maynard; Barry Spinney, Wayland, all of Mass.

[73] Assignee: Digital Equipment Corp., Maynard, Mass.

[21] Appl. No.: 866,958

[22] Filed: Apr. 9, 1992

Related U.S. Application Data

[63] Continuation of Ser. No. 546,618, Jun. 29, 1990, abandoned, which is a continuation-in-part of Ser. No. 483,296, Feb. 20, 1990, abandoned, which is a continuation of Ser. No. 231,773, Aug. 8, 1988, abandoned.

[51] Int. Cl.$^6$ ..................................................... H04L 12/46
[52] U.S. Cl. .................. 370/85.5; 370/85.14; 370/85.15
[58] Field of Search ............................. 370/85.14, 16.1, 370/85.5, 85.15, 85.13, 85.4, 94.1; 340/825.05, 825.5

[56] References Cited

U.S. PATENT DOCUMENTS

| | | | |
|---|---|---|---|
| 4,468,734 | 8/1984 | Lanier et al. | 364/200 |
| 4,507,777 | 3/1985 | Tucker et al. | 370/16.1 |
| 4,567,590 | 1/1986 | Bederman | 370/85.15 |
| 4,577,313 | 3/1986 | Sy | 370/85.14 |
| 4,646,232 | 2/1987 | Chang et al. | 364/200 |
| 4,789,982 | 12/1988 | Coden | 370/85.5 |
| 4,932,023 | 6/1990 | Geyer et al. | 370/85.5 |
| 4,941,142 | 7/1990 | Kida | 370/85.5 |
| 5,053,946 | 10/1991 | Jain | 364/200 |
| 5,142,530 | 8/1992 | Geyer et al. | 370/85.5 |
| 5,224,096 | 6/1993 | Onishi et al. | 370/85.5 |
| 5,235,593 | 8/1993 | Grow et al. | 370/85.5 |
| 5,280,478 | 1/1994 | Yang et al. | 370/85.5 |
| 5,280,582 | 1/1994 | Yang et al. | 395/200 |

FOREIGN PATENT DOCUMENTS

| | | |
|---|---|---|
| 0119003A3 | 9/1984 | European Pat. Off. . |
| 0328004A1 | 8/1989 | European Pat. Off. . |
| 0354809A2 | 2/1990 | European Pat. Off. . |
| 3507618.6 | 9/1986 | Germany . |
| WO-A-91/03898 | 3/1991 | WIPO . |

OTHER PUBLICATIONS

May 13, 1988, Memo to: IEEE 802–5 Voting Members by Jacalyn Winkler, 2 pages.

(List continued on next page.)

Primary Examiner—Melvin Marcelo
Attorney, Agent, or Firm—A. Sidney Johnston; David A. Dagg

[57] ABSTRACT

Frame processing apparatus, and a related method for its operation, for use in a station connected to a token ring network, to ensure rapid stripping of frames from the network without reference to source addresses in the frames, and in spite of the possible presence of extraneous no-owner frames on the network. The adverse effects of extraneous no-owner frames are avoided by any of three techniques. First, transmitted information frames are preceded by a start strip delimiter frame and followed by an end strip delimiter frame. The process strips all incoming frames (except tokens and ring initialization frames, which are specially handled), but does not count the stripped frames until the start strip delimiter frame is detected. Therefore, extraneous frames preceding the transmitted information frames will be stripped but not counted, and all of the transmitted frames will be stripped. In another approach, an estimated stripping time is used to terminate stripping. Frame counters are not then needed and extraneous frames will be stripped prior to the desired information frames. A third approach is to preset the transmitted frame count to some selected value, so that more frames will be stripped than were transmitted. Thus, preceding extraneous frames will be stripped, but the end strip delimiter will still terminate stripping and preclude overstripping.

53 Claims, 15 Drawing Sheets

OTHER PUBLICATIONS

May 20, 1988, Modifications to the IEEE 802.5 Standard to Include Early Token Release, by Jacalyn Winkler, 6 pages.

Dec. 1, 1987 Changes to the IEEE 802.5 Standard to Include Early Token Release, 3 pages.

Nov. 17, 1986, Enhancement to the Token Ring Protocol: Early Token Release, 5 numbered pages and 8 Figs.

1985, ANSI/IEEE Standard 802.5—1985, 89 + pages.

National Telecommunications Conference. vol. 1, Dec. 1981, New Orleans, La., US. W Bux et al. "A Reliable Token–Ring System for Local Area Communication" pp. A2.2.1–A2.2.1.

EP 91 30 5330 European Search Report, Jan. 15, 1992.

Data Communications. vol. 13, No. 9, Aug. 1984, New York, N.Y. US, pp. 125–139; J. Bartik; "IBM's token ring: Have the pieces finally come together?", see p. 131, left–hand column, lines 3–13, see p. 135, left–hand column, line 17–p. 136, left–hand column, line 10.

NOTE: FIGURE OMITS RING INITIALIZATION AND ERROR RECOVERY CASES.

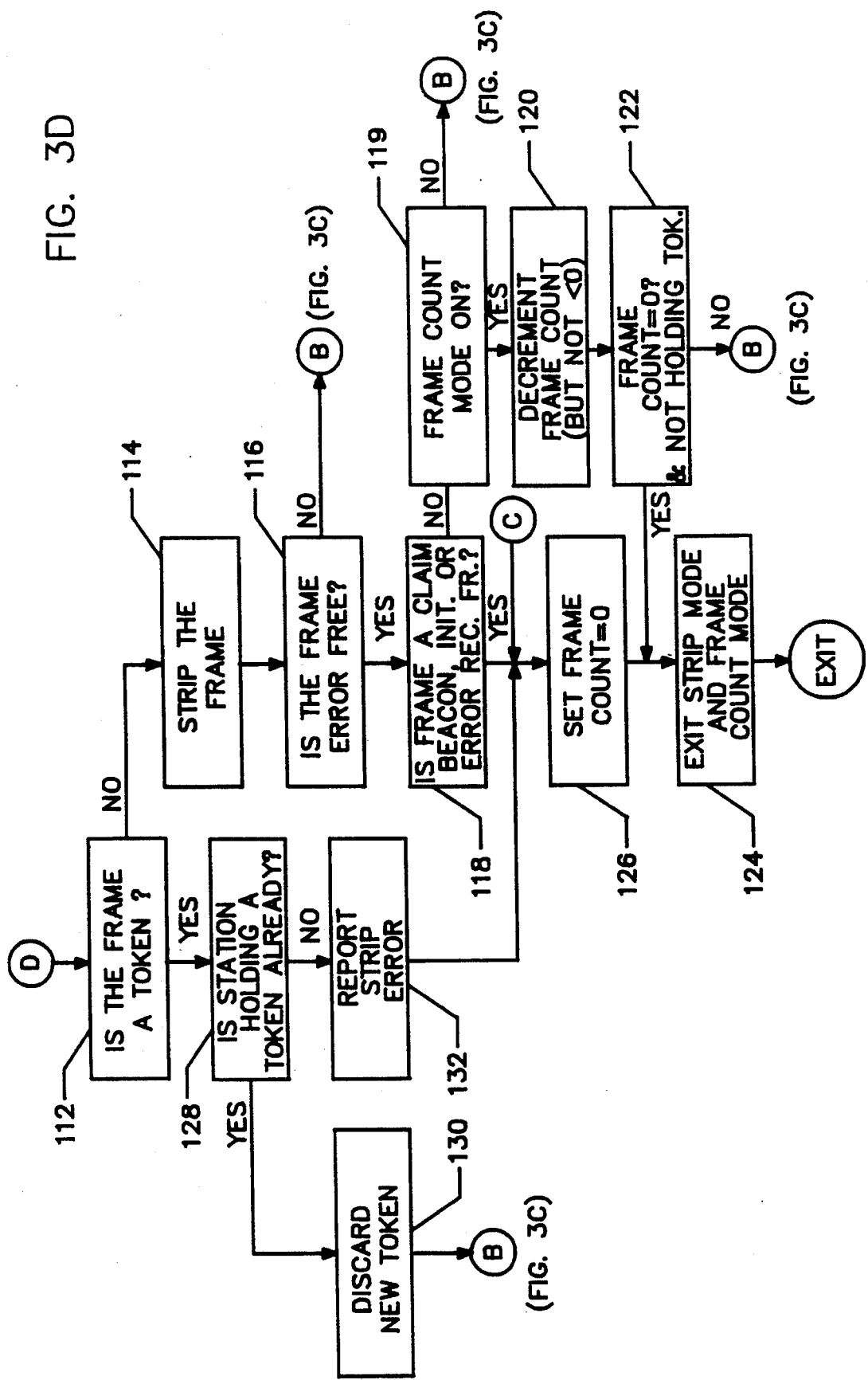

NO OVERSTRIP OR UNDERSTRIP

FRAME REMOVAL MECHANISM FOR TOKEN RING NETWORKS USING ONE OR MORE START STRIP DELIMITER FRAMES OR CIRCULATION TIME INTERVAL

CROSS-REFERENCE TO RELATED APPLICATION

This is a continuation of Ser. No. 07/546,618 filed Jun. 29, 1990, abandoned, which is a continuation-in-part of Ser. No. 07/483,296, filed Feb. 20, 1990, now abandoned, which is a continuation of Ser. No. 231,773, filed Aug. 8, 1988, now abandoned. The parent case, Ser. No. 07/231,773 was continued as Ser. No. 07/884,321, filed May 11, 1992, now allowed with title of "Frame Removal Mechanism Using Count of Frames and Delimiter Frame for Token Ring Networks" U.S. Pat. No. 5,331,636.

BACKGROUND OF THE INVENTION

This invention relates generally to computer networks comprising a plurality of stations that communicate data in a ring using a token-based protocol, and, more specifically, to a mechanism for removing information frames from the network.

A computer network enables various devices, such as processors, mass storage devices, and printers, to communicate with each other over high speed communication links. The devices are connected or interfaced to the network, and thus transfer data to and from the network, through stations. The stations are interconnected by communication links in a manner that defines the network topology.

One example of such a network is a Local Area Network (LAN). A LAN allows high-bandwidth communication among devices within a limited geographical area. The communication links typically include optical fibers, coaxial cables, or twisted conductor pairs.

LANs may be configured using any of a number of topologies, for example, buses or rings. In a network configured as a bus, data signals are usually communicated along a bus in both directions from an originating station. In a network configured as a ring, network stations transmit data around the ring in one direction. Thus, when a station transmits data onto the ring, the data signals travel around the ring from station to station, with each station receiving the data signals from the preceding station and repeating them to the succeeding station, until the data signals reach the station that is to receive them. In a well known ring network, the receiving, or destination, station also repeats the data to its downstream successor, and the data signals thus continue around the ring to the originating, or source, station. Each source station strips its own frames from the ring.

Network stations transmit and receive data in the form of frames. The frames contain, in addition to the data, addresses, an error detection sequence and status flags, such as a flag indicating receipt of the frame by the intended receiving, or destination, station. The frame addresses identify the source station and the destination station or stations.

Every station and every attached device are each identified by a unique address. Thus each station has associated with it its unique station address and the addresses of its attached devices. The stations may also have other addresses associated with them. A frame directed from a source station to a single destination station thus contains the address of the source station and, for example, the address of a specific device attached to the destination station. Each station may maintain a list of its associated addresses, such that the station receives the frames containing any one of its addresses.

A destination station, in addition to repeating a received frame to its succeeding station, copies the frame for use by the appropriate device(s) associated with the station. The destination station may also set the applicable status flags indicating receipt of the frame.

When a frame has returned to its source location, the source station, recognizing the source address in the frame as its own, removes, or strips, the frame from the ring data stream. The present invention is concerned with the orderly stripping of frames from the network, to ensure that unwanted frames of data do not accumulate, as a result of "understripping," and that frames destined for other stations are not inadvertently stripped from the ring, as a result of "overstripping."

The stations operate in accordance with communication protocols that facilitate the orderly transfer of information frames over the communication links. One type of communication protocol is a token ring system. Such systems use a token, that is, a specific string of bits in the form of a special frame, to indicate that a transmitting station has completed its transmission. A succeeding station may then, following the dictates of the protocol, begin transmitting frames upon receipt of the token.

In a token ring system, a station may not transmit data over the ring unless it holds the token. Thus if a station has frames to transmit around the ring it first removes the token from the ring data stream, that is, the station "captures" the token, when it is received from a preceding or upstream station. The capturing station then begins its transmission of information frames. When the station is finished with the information frame transmission it retransmits the token, effectively releasing it. The succeeding stations thereafter transfer the token around the ring until a station captures it in order to make a transmission. Various mechanisms ensure fairness of access, limiting the number of frames that can be transmitted by a station on capturing the token.

Two or more rings, or more generally, two or more LANs, may be connected by a bridge, which is a special purpose station simultaneously connected to multiple LANs, to form an extended LAN. The bridge thus facilitates communication between a transmitting station on, for example, one of the rings and a receiving station on another ring. The bridge functions as a destination station on the ring containing the transmitting station and copies the frames directed to a second ring, while also repeating these frames on the source station ring. The bridge also functions as a transmitting station on the second ring and transmits the copied frames in that ring after capturing the ring's token. The second ring may contain the destination station, or it may be an intermediate ring containing a bridge to another LAN, which may, in turn, contain the destination station or be another intermediate LAN.

There are two basic modes of bridge operation: transparent and non-transparent. A bridge operating transparently transmits the frames originated by the source station without significantly altering them, that is, without changing any portion of a frame that is protected by the frame's error detection sequence. Alternatively, a bridge operating non-transparently significantly alters the frames originated by the source station before transmitting them to the connected LAN. A non-transparent bridge may, for example, alter the source address to the address of the bridge on the second ring or it may alter certain other information in the frame.

The non-transparent bridge must recalculate and replace the error detection sequence contained in each of the frames to prevent the frame alterations from being treated as errors. However, if the bridge incorrectly copies a frame or inadvertently copies an erroneous frame, alters it, introduces an error inside the bridge, and then recalculates the error detection sequence, it may render the frame errors undetectable. Therefore, the integrity of the frame information is considered to be reduced in non-transparent bridge operation.

The bridge, regardless of the mode in which it operates, must strip from the second ring the frames it transmits. Typically, a station "recognizes" the source address in that frame as its own address and strips the frame. A bridge that leaves the addresses unaltered, and which is not the original source station, may not recognize the source address in the frames it has transmitted over the second ring. The bridge is capable of transmitting frames that were originally transmitted by one of many source stations on one or more different LANs. When the frames return to the bridge over the second ring, the bridge may not have time to compare the frame source address with the addresses of the many source stations on the various LANs before the decision to strip must be made. Thus the bridge could repeat a frame that should be stripped by it. This problem is aggravated by the large number of stations or nodes, typically tens of thousands, that may be included in an extended LAN. The complexity and cost of maintaining a database of all such stations, merely to facilitate frame stripping, provide another important reason to seek an alternative solution to the frame stripping problem, i.e. to determine which frames to strip.

One possible method for stripping frames involves having the bridge mark the last frame in the sequence of transmitted frames, e.g. by setting a flag in the frame. The bridge then, after a transmission, strips the frames it receives over the ring until it detects the set flag in one of the frames. If, however, the frame containing the flag is lost or corrupted, making the set flag undetectable, the bridge may continue to strip the frames it receives over the ring until it is signalled to stop, for example, by the expiration of a locally kept timer. The bridge would thus strip frames originated by other stations on the extended LAN, preventing the frames from reaching their intended destinations. If the flag is a single-bit flag, a bit-error in the frame may result in the flag appearing reset, and in this case the bridge would stop stripping before it had removed all of its frames.

A non-bridge station that connects many devices to the LAN may also have difficulty determining which frames it should strip. Such a station must determine whether to strip a frame within the time it takes the frame to pass through the station. Thus the station may not have time to match the frame source address with one of its many associated addresses, and another method for determining which frames to strip must be used. As mentioned above, the cost and complexity of maintaining a large database for frame stripping purposes are extremely high.

The solution to this problem proposed in the cross-referenced application is for each station to keep a count of the frames transmitted, and to transmit one or more coded marker frames following all the messages transmitted by a station and immediately prior to transmitting the token. After a transmission is begun, the station strips from the ring the frames it next receives, decrementing the count for each properly stripped (i.e., error free) frame, until either the count is reduced to zero, or one of its marker frames is detected. Although this basic technique performs satisfactorily in most conditions, it is slow to correct the problem that arises when dealing with the existence of multiple extraneous No-Owner Frames, i.e. frames that circulate about the ring network and are not recognized by any stations as candidates for stripping. Frames of this type can be generated in a number of ways. For example, a station may transmit multiple information frames and be removed from the network before there is time for it to strip the frames. Or, if a duplicate token is erroneously generated by a network noise error, a station may erroneously terminate stripping upon receiving this second token, leaving its transmitted information frames circulating as No-Owner Frames. The second token may eventually be stripped, when it reaches a station that already has the real token. Similarly, these No-Owner Frames may also be eventually stripped. However, in the meantime considerable overhead is incurred at the destination station.

If multiple No-Owner Frames are received while a station is in a stripping mode, they will be stripped from the ring until the frame count is decremented to zero. This will terminate stripping and leave some or all of the station's information frames still circulating as new No-Owner Frames.

A related difficulty is the occurrence of stripping errors, particularly understripping errors, wherein a station prematurely terminates stripping of information frames, when a second, erroneously generated, token is received by a station that is presently stripping frames and does not hold the real token. The cross-referenced application provides no way of detecting such errors.

Another difficulty with the solution proposed in the cross-referenced application is that, depending on the size of the network, the frame counter required may have to be relatively large, thereby increasing the cost and complexity of the station.

It will be appreciated from the foregoing that there is room for further improvement in the techniques proposed in our prior application. Although the present invention involves improvements over the invention defined by the prior application cross-referenced above, the prior application is not believed to be prior art to the present invention.

SUMMARY OF THE INVENTION

The present invention resides in a method, and related apparatus, for stripping information frames from a token ring network in such a manner that problems arising from the circulation of multiple No-Owner Frames are avoided. Another feature of the invention is the reduction of the size of a frame counter used to count transmitted information frames and stripped received information frames, and an optional approach for eliminating the counter entirely. Another feature of the invention is the provision of strip error detection, to provide an indication of the occurrence of understripping, so that appropriate action may be taken.

Briefly, and in general terms, the apparatus of the presently preferred embodiment of the invention comprises transmitting means for transmitting onto the network a number of information frames, preceded by a start strip delimiter frame and followed by an end strip delimiter frame, and receiving means for receiving frames and other information from the network, and processing the received frames. The receiving means includes frame stripping means for stripping from the network information frames received during a time period that begins no later than when the transmitting means begins transmitting the start strip delimiter frame. The apparatus also includes stripping termination means, for detecting the occurrence of any of a number of preselected conditions intended to terminate operation of the frame stripping means, and frame counting means, for recording the number of frames transmitted by the transmitting means and the number of frames received and stripped by the frame stripping means.

One of the conditions terminating stripping is that the number of frames transmitted is equal to the number of frames received and stripped. Counting may be implemented by means of a frame counter that is incremented when a frame is transmitted and is decremented when a frame is received and stripped. Finally, the apparatus includes means for disabling the frame counting means from counting stripped frames. The stripped frames are not counted until after receipt of the start strip delimiter frame, and any extraneous No-Owner Frames received prior to the start strip delimiter frame will be stripped but not counted as stripped. Therefore, the existence of any No-Owner Frames will not adversely affect network performance.

Preferably, the stripping termination means further includes means for terminating stripping upon the receipt of at least one end strip delimiter frame, whereby stripping will be terminated either upon receipt of an end strip delimiter frame or when the frame counter reaches zero. The stripping termination means further includes means for terminating stripping upon the receipt of a token when no token is currently held by the station, or upon the receipt of a special frame reinitializing the network.

In accordance with one aspect of the invention, the apparatus also includes means for indicating understripping error conditions in which stripping is prematurely terminated before all of the transmitted frames have been received. An understripping error occurs upon the receipt of a token while the frame stripping means is operative, and while the station is not holding a token.

In another embodiment of the invention, the frame counting means responds to sets of n frames each instead of to single frames. A special delimiter frame is inserted after every n frames that are transmitted, and the frame counting means keeps a frame count in modulo-n terms. In this manner, smaller counts are needed to keep track of transmitted and received frames.

In accordance with another aspect of the invention, the counting means includes a timer for providing an estimated stripping termination time. The timer is started after transmitting a first end strip delimiter frame or, if end strip delimiter frames are not used, after transmitting the token. The timer counts down from an initial value derived from the estimated or maximum network latency or delay time for a transmitted frame to traverse the entire ring network. The timer is stopped when one of the other stripping termination conditions is met, but if the timer is counted down to zero before one of the other condition is met, stripping is terminated. In other words, the expiration of the estimated or maximum ring latency time is an additional condition that terminates stripping.

In terms of a novel method, the invention comprises the steps of capturing a token from the network, transmitting onto the network one or more information frames, preceded by a start strip delimiter frame and followed by an end strip delimiter frame and the released token, entering a strip mode upon capturing the token, receiving frames from the network and, if in the strip mode, stripping the frames without regard to their source addresses or frame content. In the presently preferred embodiment, the method also includes counting frames transmitted onto the network, detecting receipt of the start strip delimiter frame, counting frames stripped from the network after receipt of the start strip delimiter frame, and leaving the strip mode if any of the following events occurs: (a) the number of frames counted as transmitted is equal to the number of frames counted as stripped, or (b) an end strip delimiter frame originated by this station is received, or (c) a token is received after the token was released, or (d) a ring initialization or error recovery frame is received. Extraneous frames that may precede the start strip delimiter frame will be stripped but not counted, and the entire set of transmitted frames will be stripped in spite of the presence of the extraneous frames.

The method may also include detecting any understripping errors and providing an indication thereof, as determined by detecting the receipt of a token when the station is in strip mode and is not holding a token.

As discussed above, a timer may be used, either alone or as an adjunct to other techniques, to terminate frame stripping. Another variant of the method is to preset the frame count to a bias value. This will be effective in handling extraneous frames that precede the frames transmitted from the station performing stripping.

It will be appreciated from this summary that the present invention represents a significant advance in the field of token ring networks. Specifically, the invention handles the possible presence of extraneous No-Owner Frames while still stripping transmitted information frames as required. Alternate approaches are described and, although the use of a start strip delimiter frame is presently preferred, the other approaches achieve practically the same result with less complexity. Other aspects and advantages of the invention will become apparent from the following more detailed description, taken in conjunction with the accompanying drawings.

BRIEF DESCRIPTION OF THE DRAWINGS

FIGS. 3A–3E together comprise a flowchart depicting the operation of a bridge on the extended LAN of FIG. 1, in accordance with the preferred embodiment of the present invention;

DESCRIPTION OF THE PREFERRED EMBODIMENT

Figure 1:
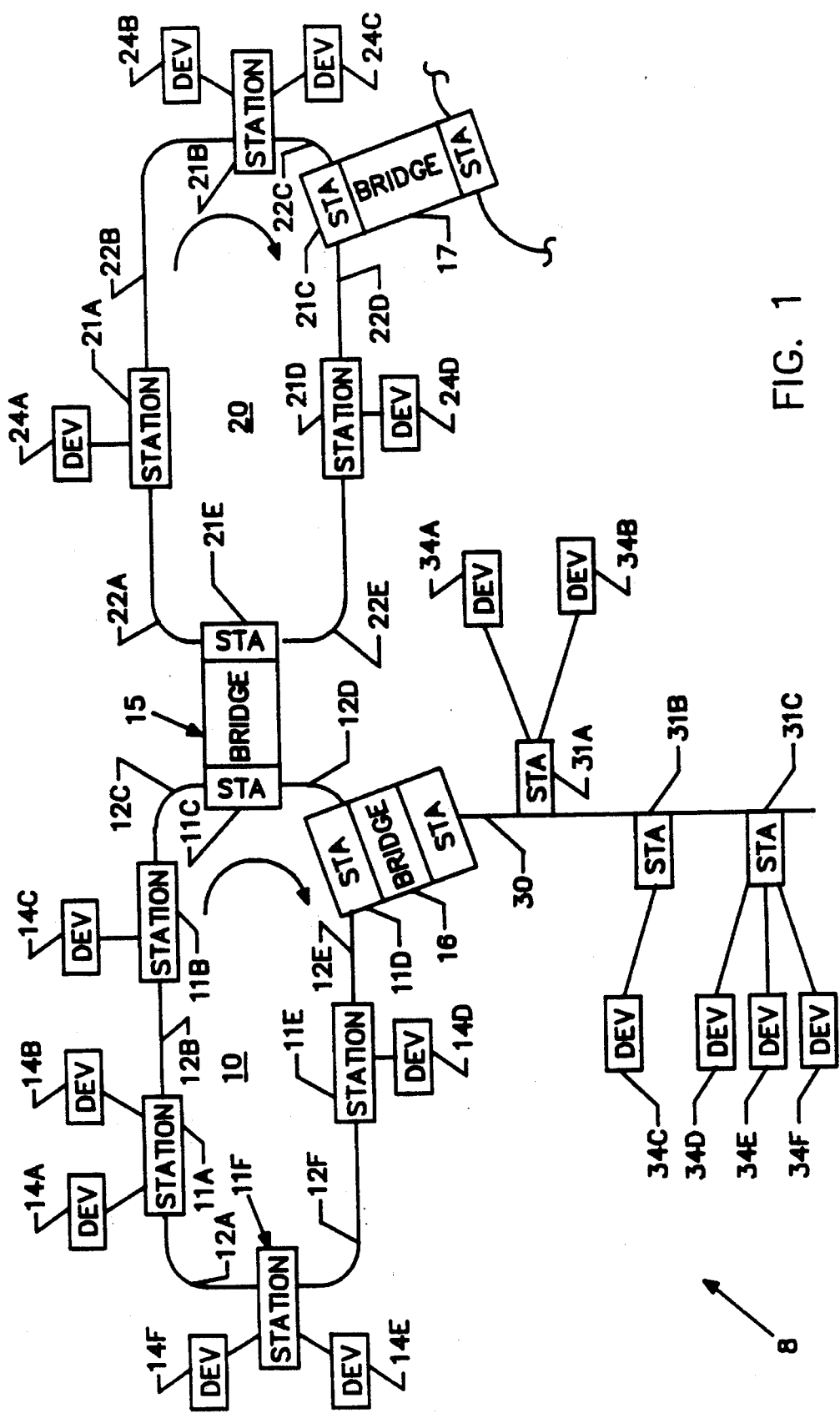
FIG. 1 is a functional block diagram of an extended local area network (LAN)

As shown in the drawings by way of illustration, the present invention is concerned with techniques for stripping information frames from a token ring network. In accordance with a common token ring communication protocol, a station that transmits a frame to another station on the network is itself responsible for removing the frame when it next appears at the transmitting station. This rule is simple to implement in a single token ring network, since a transmitting station can readily identify its own message from a source address contained in each information frame. However, a bridge connected to multiple rings has to forward information frames from one ring to another and cannot so readily identify frames that must be stripped. A bridge may take a significant time to check through its database and determine whether it has responsibility for stripping a particular frame. This potential delay time may render a bridge incapable of stripping information frames in real time as they arrive at the bridge. In some instances, non-bridge stations have a similar difficulty.

As shown in FIG. 1, a ring 10, i.e. a local area network (LAN) configured in a ring topology, includes a plurality of stations 11A through 11F connected by communication links 12A through 12F. The stations 11 interface one or more devices 14A through 14F to the ring. The devices 14 may be of diverse types, including computers, mass storage devices, telecommunications links, printers, and so forth, all of which may transmit information to, or receive information from, other devices in the ring 10 over the communication links 12.

Similarly, a ring 20 includes a plurality of stations 21A through 21E interconnected by communication links 22A through 22E, and bus 30 includes a plurality of stations 31A through 31C. Each of the stations 21 and 31 connects one or more devices, identified generally as 24 or 34, to the ring 20 and bus 30, respectively.

Ring 20 is interconnected with ring 10 by a bridge 15. It is also interconnected by a bridge 17 to another network (not shown). The bridges are special purpose stations that are simultaneously stations on each of the LANs they interconnect. Bridge 16 interconnects bus 30 with ring 10; thus stations on ring 20 can also communicate with stations on bus 30 via ring 10 using both bridges 16 and 15. The interconnected networks together form an extended LAN 8.

The stations 11 and 21, including the bridge stations, transmit information over the respective communication links 12 and 22 in the form of frames, the structure of which will be described by reference to FIG. 2. Communication between two stations on the same ring occurs when, for example, one station 11A transmits a frame to another station 11E. The originating station 11A transmits signals in the form of a bit stream forming the information frame, onto the communication link 12, in the direction of the arrow in FIG. 1, i.e. the frame is first transmitted to station 11B. Station 11B repeats the frame, after identifying it as being destined for another station, and the process continues until station 11E, the destination station, receives the frame and copies it for one of its connected devices 14. The information frame continues its journey through station 11F and back to station 11A, which is responsible for removing the frame.

The determination of whether a station such as 11A or 11B may transmit a frame onto its network ring is based on whether the station holds a token. A token is a special sequence of bits that the stations transmit around the ring for the purpose of scheduling access or transmission rights. A station that captures and holds the token has the exclusive right to transmit. Only one token should exist on each ring, and it is never stripped. If, for example, station 11A wishes to send a frame, it waits for the token to arrive and simply does not repeat or retransmit it onto the ring, thereby "capturing" the token and the right to transmit a new message. The station 11A would then transmit one or more information frames, followed by the token, which again becomes available for capture by other stations. In some token ring networks, there is a time limit associated with right to transmit, and therefore a limit on the number of frames that can be transmitted before the token must be released.

When a station 11 receives a frame that it originated, other than a token, the station must strip the frame from the ring 10. Thus, if stripping is accomplished as it should be, a frame is transmitted around the ring only once. If the originating station fails to strip one of its frames, the intended destination station may receive duplicates of the frame. The destination station receives these duplicates at a faster rate than it ordinarily receives frames. Thus the station must process these frames more quickly, resulting in additional station overhead and possibly station errors.

Communication between two station on different rings, for example a station 21 on ring 20 and a station 11 on ring 10, is accomplished using the bridge 15. The bridge 15 acts as the intended receiving station on ring 20 and copies the frame, as well as repeating it to the next station 21 in the origination station's ring 20. The bridge 15 then transmits the copied frame onto ring 10, after it captures the ring 10 token. After the frame is transmitted around ring 10, it is received by the bridge 15, which is responsible for stripping it. The originating station 21 is still responsible for stripping the frame from the ring 20 to which the originating station is connected, but each bridge is responsible for stripping duplicate copies of frames that it transmits onto other rings. In brief, each bridge is responsible for stripping frames that it transmits onto other rings. Operation of stations, such as the bridge 15, using the present invention is discussed in more detail with reference to FIGS. 3A–3F.

Figure 2:
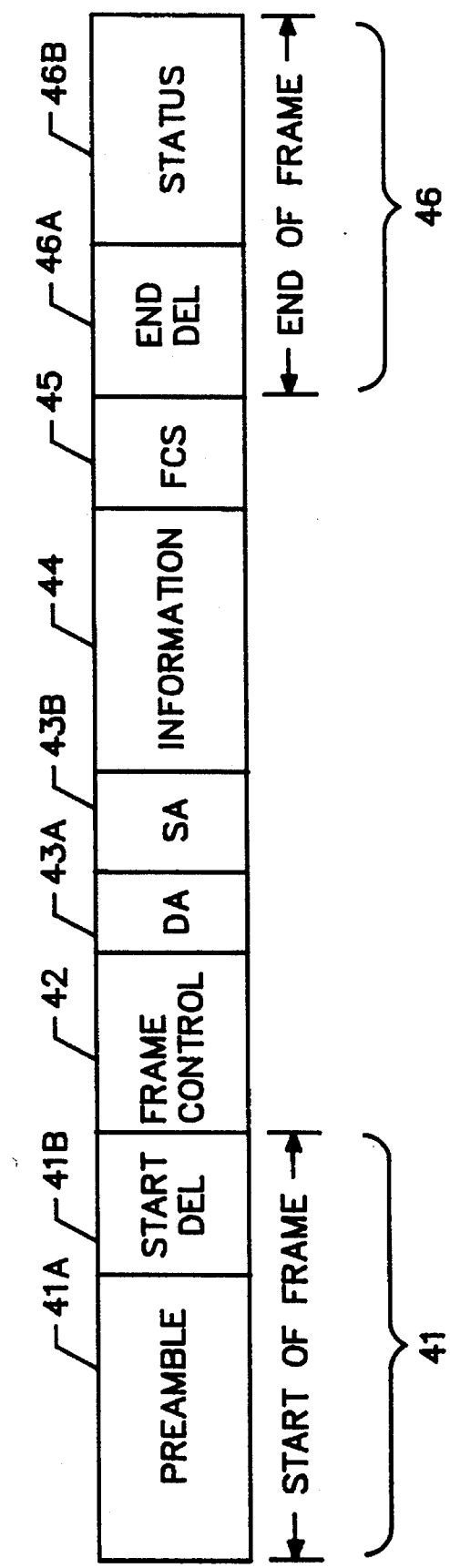
FIG. 2 is depicts an information frame used in the extended LAN of FIG. 1.

As noted above, information is transferred in the form of frames, the structure of which is shown in FIG. 2. A frame is divided into several fields. The start of a frame is denoted by a preamble field 41A and a start frame delimiter field 41B, which further denotes the beginning of the portion of the frame containing the frame information. These fields are generally referred to as a start-of-frame sequence 41.

Immediately following the start-of-frame sequence 41 is a frame control field 42 detailing whether the bit stream is a token or a frame and, if it is a frame, indicating the type of frame, for example an information frame or other special type of frame. The next two fields are address fields 43A–B, namely a destination address field DA 43A, whose contents identify the intended recipient(s) of the frame, and a source address field SA 43B, whose contents identify the source station. The information field 44 follows the address fields 43, and is in turn followed by a frame check sequence field 45 containing an error detection sequence used by the receiving station to detect errors in any of the frame control field 42, the address fields 43, the information field 44 and the frame check sequence field 45.

The end of the frame is denoted by an end-of-frame field sequence 46. The sequence 46 includes an end delimiter field 46A, which defines the end of a frame, and a frame status field 46B containing a set of status flags. The status flags are conditioned by a station other than the source station to provide status information to the source station. This information may include, for example, whether the frame was copied by the intended destination station(s), whether any errors have been detected, whether errors occurred on the end delimiter field, and so forth.

If a station 11 or 21 recognizes the contents of the frame destination address field 43A as one of its own addresses, that is, either its station address or one of its other associated addresses, it copies the frame for processing by its attached devices 14 or 24. It also repeats the frame to the next station in the ring as described above.

When a frame returns to its source station, the latter recognizes the contents of the frame source address address 43B as its own address, and strips the rest of the frame from the ring. When a frame is thus stripped, the start-of-frame sequence 41, the frame control field 42 and part of the address fields 43 remain. These fragments are ignored by the stations on the ring because they do not form a complete frame. They are stripped from the ring when they encounter a station in the act of transmitting.

If a ring is improperly operating, for example, if the token is lost or a break develops in the ring, the stations, such as 11A, 11B, and so forth, begin operating in an error detection and recovery mode defined by the network protocol. The error detection and recovery mode may require all stations to actively participate or it may require the participation of only a few of the stations. Two widely used network protocols include error detection and recovery techniques involving the use of special-purpose frames, namely claim token frames and beacon frames.

Claim token frames are used when the ring is initialized, or when it must be reinitialized because the token is lost or some other predefined error condition occurs. Basically, each station 11 and 21 has associated with it a priority for error detection and recovery purposes. When the token is lost, each station continuously transmits claim token frames containing its priority until it receives another station's claim token frame. The receiving station then compares the priority in the frame with its own priority, and if the station has a lower priority than that contained in the frame, the station repeats the frame. Otherwise, the station strips the frame from the ring and transmits another of its own claim token frames. When a station receives its own claim token frame, which indicates that the station has the highest priority, it originates the token for the ring.

Beacon frames are used when a break in the ring or a substantial ring reconfiguration is suspected. Basically, each station continuously transmits its own beacon frames to downstream stations. A downstream station, upon receipt of a beacon frame, stops transmitting its own beacon frames and repeats the received beacon frames to its downstream station. When a station receives its own beacon frames, it is assumed that the network is properly configured and ring re-initialization, involving the use of the claim token frames as described above, is begun.

Figure 5:
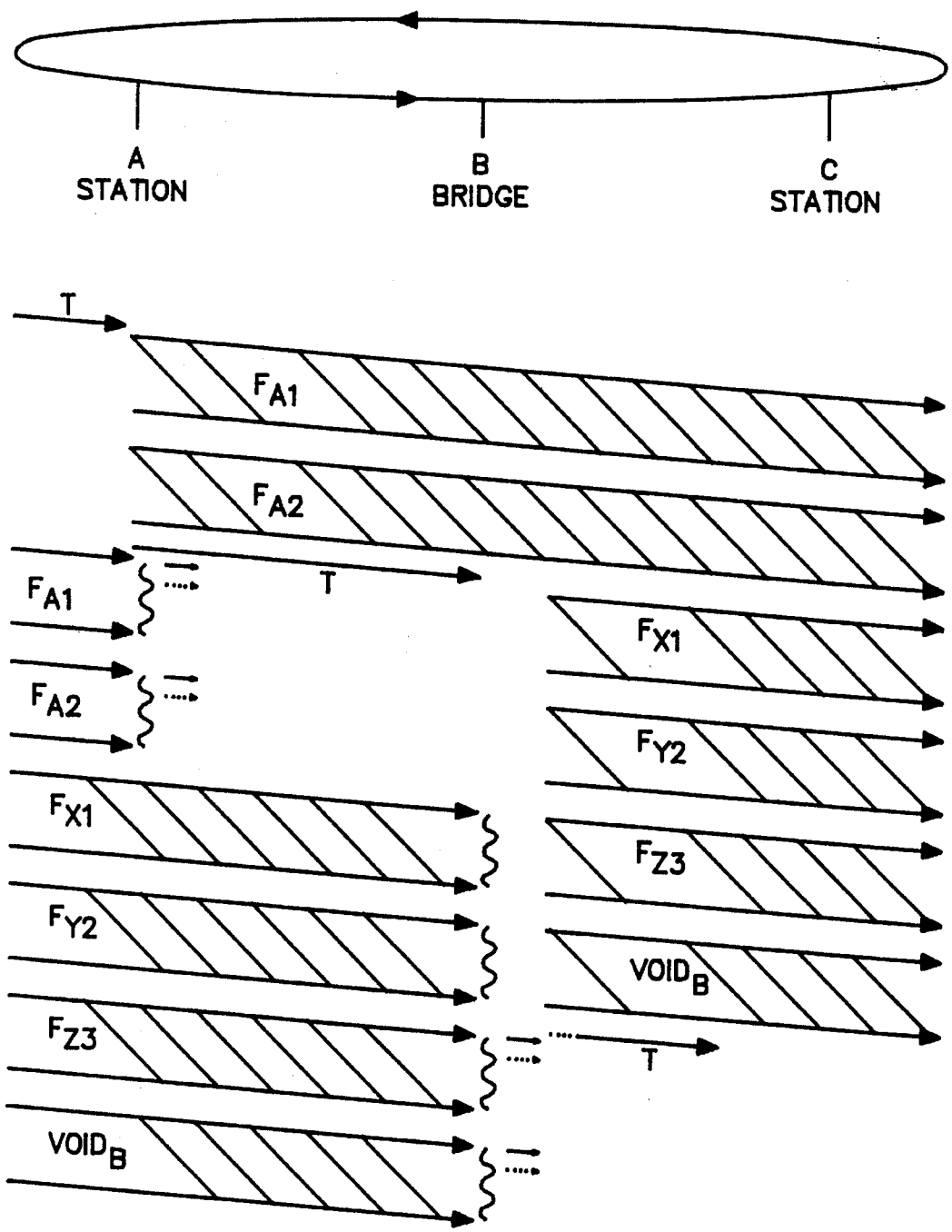
FIGS. 5–7 are space-time diagrams depicting operation of a three-station token ring network under various conditions.

A detailed description of the frame stripping operation at bridges or other stations using the invention can best be understood if it is first shown how the frame stripping operation operates in general terms. This can be accomplished by consideration of various space-time diagrams that depict the progress of frames around a ring network. FIG. 5 is such a diagram, depicting operation of a ring having three stations A, B and C, of which B is a bridge station. The space axis is horizontal, with the positions of each frame being shown with reference to the three stations A, B and C. Given the limitations of a two-dimensional representation, the spatial positions of the stations are shown in relation to a single axis, rather than on a continuous ring. Therefore, one has to view each frame as "wrapping around" from station C to station A. The time axis is vertical, with time increasing in a downward direction. Thus the double line representing each frame slopes downwardly to the right, consistent with the passage of time as a frame passes from A to B and then to C.

In the example depicted in FIG. 5, a token, indicated by the letter T is first received by station A, which captures the token and begins transmitting two frames, indicated $F_{A1}$ and $F_{A2}$. These frames are repeated by stations B and C, and then return to station A, where they are stripped by a conventional stripping mechanism, which is to say that station A recognizes the frames from their source address as originating in that station. After station A finishes transmitting the two frames, it releases the token T, for capture by B, the bridge station, which has three frames ready to transmit on this ring. Station B begins sending three frames, indicated as $F_{X1}$, $F_{Y2}$ and $F_{Z3}$. Before station B finishes sending its three frames, the first of the frames $F_{X1}$ is received at the station and is stripped. Similarly, the second and third frames are stripped as they arrive at station B. However, a different stripping mechanism is used at the bridge station for stripping frames subsequent to release of the token. This different stripping mechanism will strip frames $F_{Y2}$ and $F_{Z3}$.

As disclosed and claimed in the cross-referenced application, one technique for determining which frames to strip uses a running count of frames sent from and received at the bridge station. The count is initiated at zero and is incremented by one for every frame transmitted, and decremented by one for every frame received and stripped. If everything works as it should, the count will be zero again after the last frame is stripped. Moreover, the frame count provides a convenient mechanism for starting stripping, when the count is nonzero. An additional mechanism to determine when to stop stripping uses an end strip delimiter frame, which may take the form of a void frame, indicated as $VOID_B$ in FIG. 5. A void frame is transmitted after the information frames, and is recognized as such when received by the originating station, so that stripping may be terminated. Optionally, multiple void frames may be transmitted, for additional robustness of the stripping feature.

Figure 6:
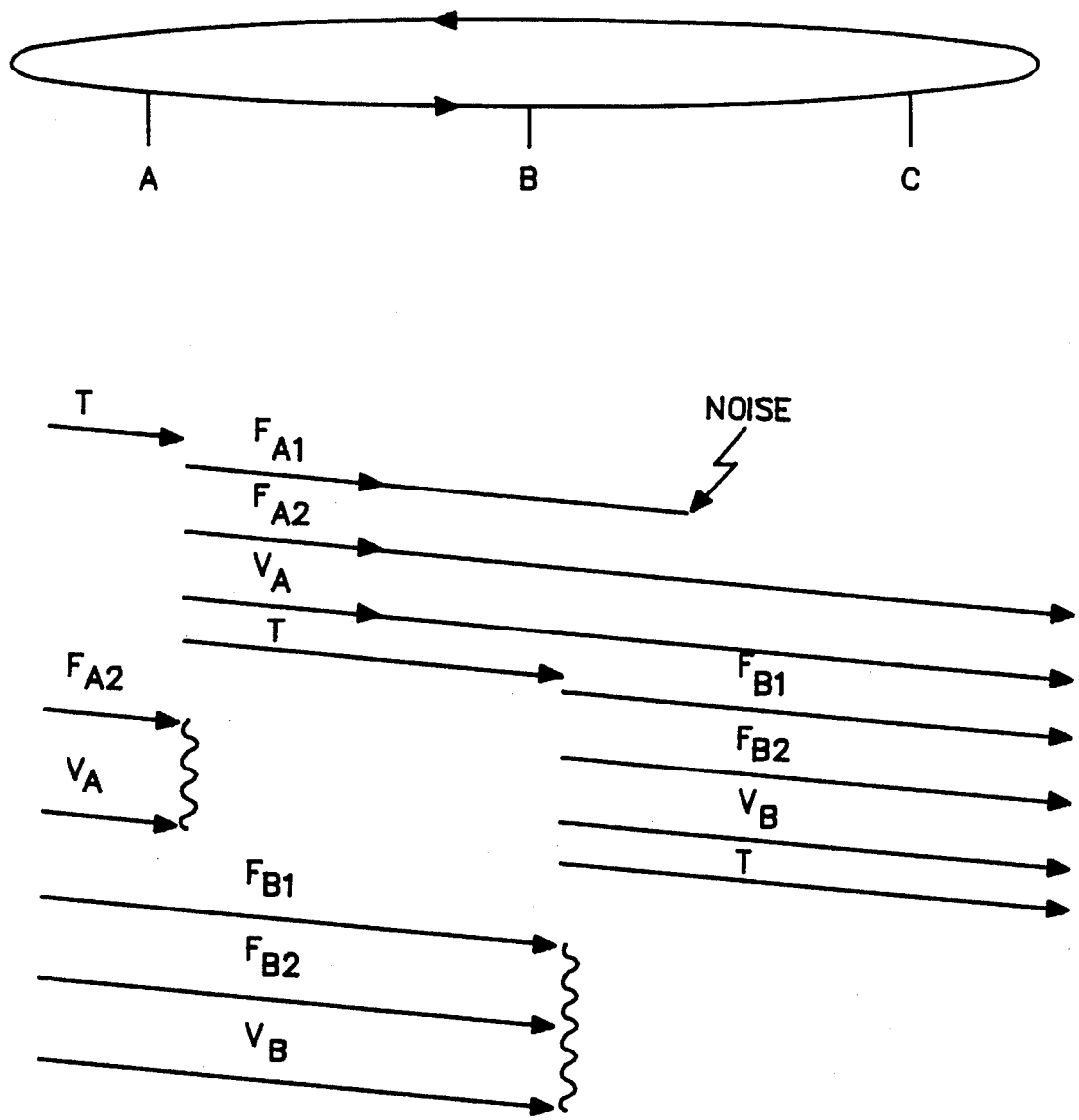

FIG. 6 is a similar space-time diagram for a three-station token ring network, but in this case all three stations strip frames in the same manner as the bridge station B in FIG. 5. The figure illustrates how an overstripping error can be avoided using the techniques of frame counting and void frames. In FIG. 6, station A transmits two information frames $F_{A1}$ and $F_{A2}$, and a void frame $V_A$, followed by the token T. Station B also sends two information frames $F_{B1}$ and $F_{B2}$, and a void frame $V_B$, followed by the token T. Through some communication error, such as a noise problem, station A's first frame $F_{A1}$ is not received back at the originating station. Instead, frame $F_{A2}$ is the first to arrive and be stripped. If frame counting alone were used to terminate stripping, there would be an overstripping error, since station A would strip three frames, ($F_{A2}$, $V_A$, and $F_{B2}$). However, since the void frame is used as an alternate test for stripping termination, station A would terminate stripping after the void frame $V_A$, and no stripping error would occur.

Figure 7:
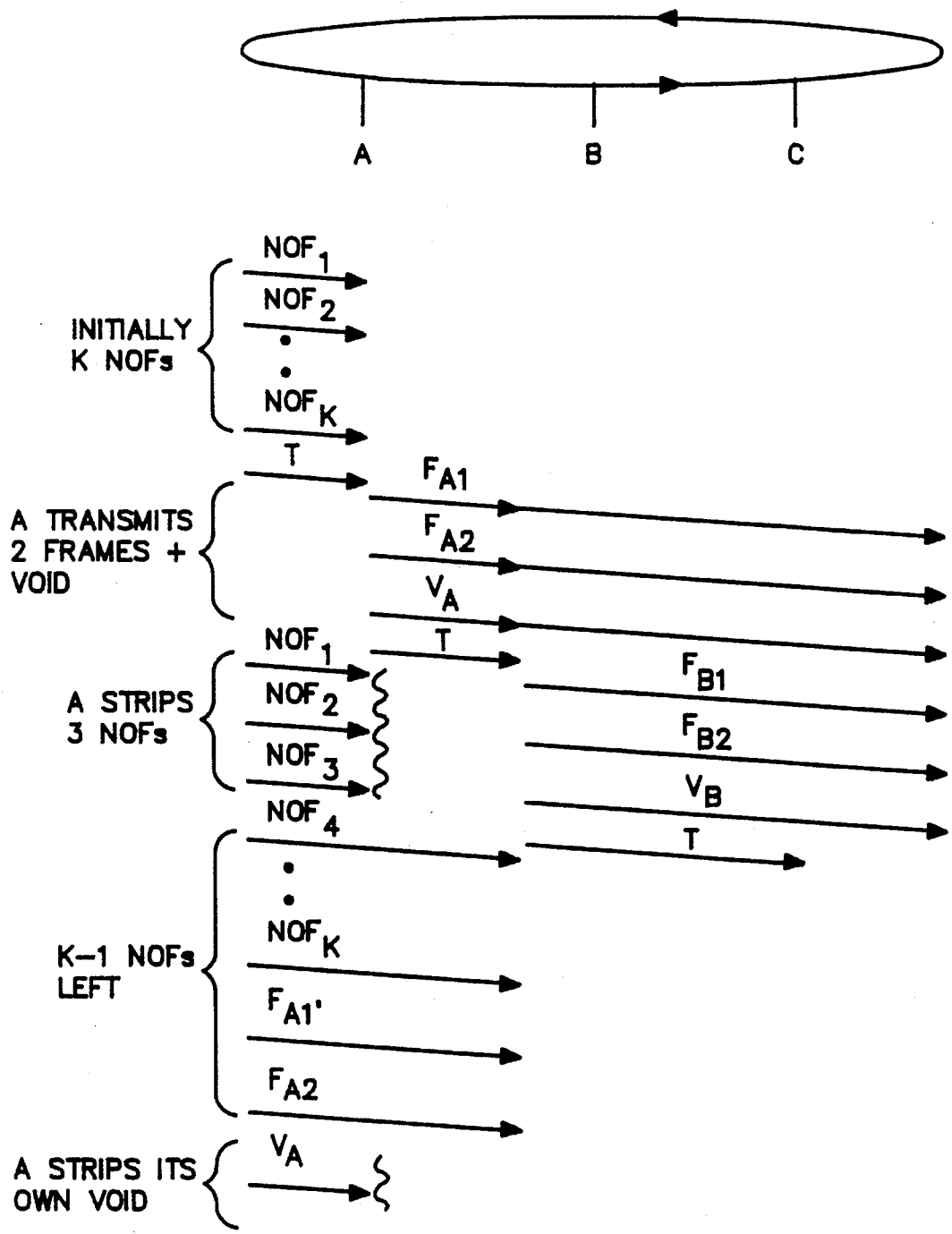

FIG. 7 is another space-time diagram, illustrating another potential stripping error, which occurs when there are No-Owner Frames circulating on the ring. A No-Owner Frame is a frame that circulates on the ring without being stripped by any station. Since no station assumes the responsibility to strip the frame, it has the potential to keep circulating unless some network station is assigned the special function of removing it and others like it. No-Owner frames can arise in a number of ways. For example, if a station transmits a message and is then withdrawn from the network before all of its message frames return for stripping, some of these frames will become No-Owner Frames. Another possibility is that a second token is generated by some means and arrives at a station that does not itself have the token, but has recently transmitted information frames onto the ring. The arrival of the token is another event that is used to terminate stripping. Once the token arrives, it is assumed that there are no more frames to strip, but if the arriving token is a second or bogus token, stripping may be terminated prematurely, leaving a number of No-Owner Frames circulating on the ring.

In the example of FIG. 7, it is assumed that there are initially k No-Owner Frames (NOFs), indicated as $NOF_1$, $NOF_2$, and so forth up to $NOF_k$. When station A receives the token, it transmits two information frames $F_{A1}$, $F_{A2}$ and a void frame $V_A$, followed by the token, as in the previous example. Station A expects to receive its own information frames next, but instead begins receiving the NOFs, and strips off the first three of these frames $NOF_1$, $NOF_2$ and $NOF_3$. It then stops stripping because its frame count is zero, totally ignoring its own information frames, which now appear following the NOFs, and become new NOFs. Station A will automatically strip its own void frame $V_A$ by another mechanism. This is the standard source-address based stripping mechanism, which is always active. In effect the stripping mechanism described in the cross-referenced application introduces a bias, i.e. a difference in the way frames are counted between transmission and reception, when multiple NOFs are present. A void frame in the situation described is counted at the time of transmission but is stripped without counting upon receipt. The net result of the stripping action of station A is that the number of NOFs is reduced by one. Multiple void frames may be transmitted for increased robustness of operation. If a single void frame is somehow lost, overstripping can occur. Multiple void frames reduce the probability of overstripping for this reason. The net result of the stripping action of station A is that the number of NOFs is reduced by one.

Although all NOFs are considered equally undesirable in that they degrade system performance, the problem outlined above goes beyond this, in that each transmission of new data will result in a change in identity of the NOFs and each new message transmission will not have its information frames properly stripped so long as multiple NOFs are circulating (even though they are gradually removed at the rate of one at a time).

An important aspect of the present invention is that NOFs are totally ignored in the counting of stripped frames. One preferred way of handling this problem is to use a new type of frame, called the start strip delimiter. Like the end strip delimiter, this frame carries no message data, but is transmitted before information frames transmitted by a station, to indicate the start of a burst of frames, which may comprise one or more information frames. As before, the information frame or frames will be followed by one or more end strip delimiters, or void frames. Also like the end strip delimiter, the start strip delimiter includes a source address, so that each station can recognize its own start strip delimiter. A start strip delimiter has to be unique and different from the end strip delimiter.

A bridge or other station using the protocol of this invention starts stripping as soon as it captures the token, but it does not start counting stripped frames until it has received a start strip delimiter that is error-free and has a source address that identifies it as having originated at this station. In the example of FIG. 7, this means that station A will strip, but not count, the NOFs that appear before the return of the frames transmitted by station A. To stop stripping, the station uses the same conditions that were used without the start strip delimiter. Specifically, there are four conditions, any one of which can terminate stripping: (1) Reception of an error-free end strip delimiter frame, (2) A frame count of zero after the station has released the token, (3) reception of a token when not holding one already, (4) or reception of a claim token frame or beacon frame during ring initialization or other error recovery frame. Details of implementation of these features will now be described with reference to FIGS. 3A–3E.

One difficulty in describing operation of a bridge station is that it performs a number of different operation concurrently. One level of concurrency exists between transmitting and receiving operations. It will be apparent from FIGS. 5–7, for example, that there is an overlap in time between transmitting and receiving operations. There is another level of concurrency in the manner in which a bridge serves as a multiple station connected to more than one network. Bridge 15 (FIG. 1), for example, is connected to ring networks 10 and 20. The bridge may be concurrently receiving frames on one network while transmitting frames on the other. Although concurrency of this general type is commonplace in processing machines, it can complicate what would otherwise be a relatively simple description.

Figure 3A:
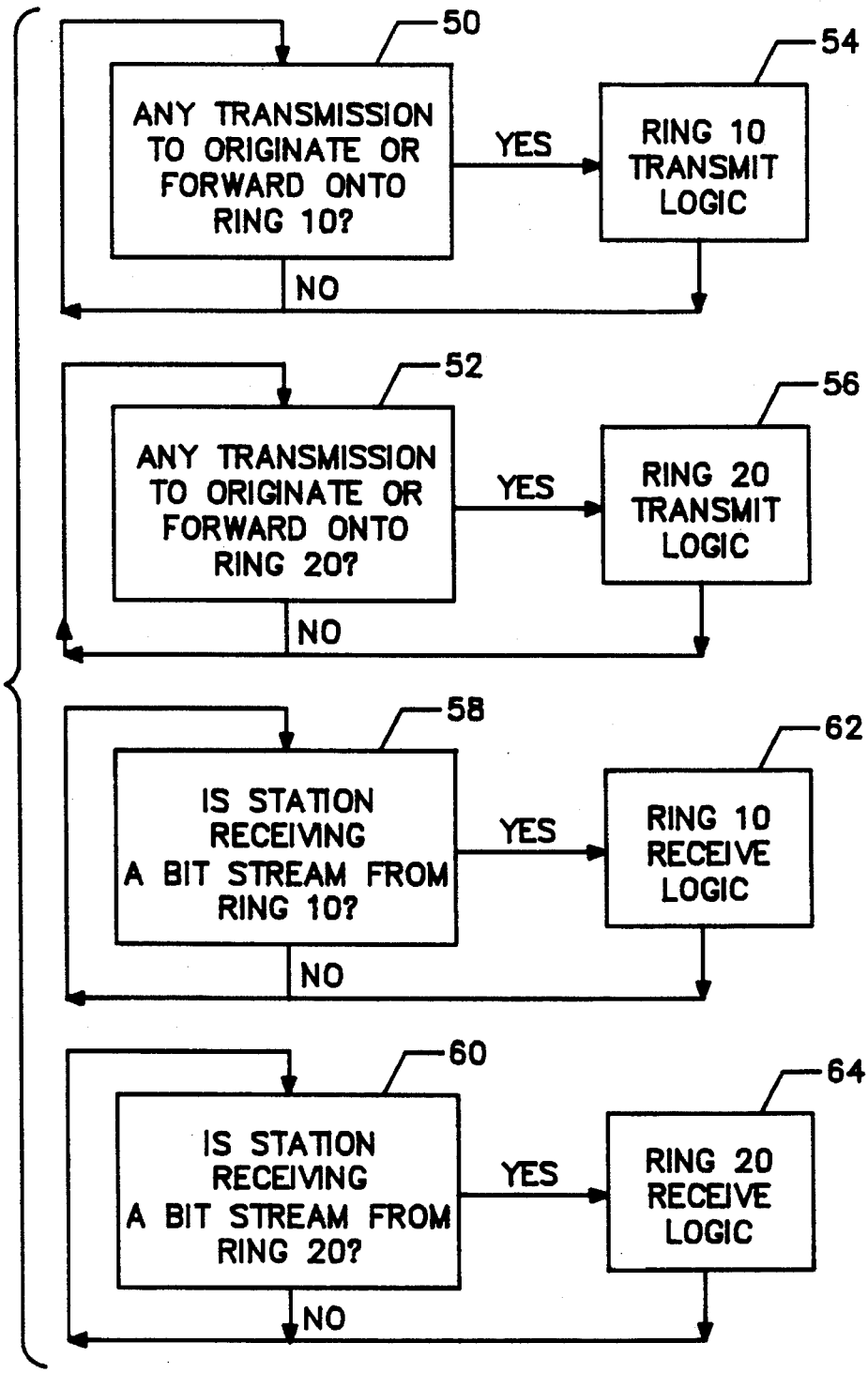

Concurrent operations of the bridge 15 are depicted in simplified form in FIG. 3A. More precisely, the operations are depicted as multiple processing loops operating in parallel. It will be understood that concurrency could be achieved in other ways, such as by using a single processor operating cyclically, but extremely rapidly, on the various processing tasks, such that they appear to be performed concurrently. FIG. 3A are the main processing loops of the bridge, during which transmitting and receiving activity is checked in two ring networks. In a first processing loop, in block 50 a check is made to determine if there is any transmission to originate on ring 10. As previously discussed, a bridge "listens" to all traffic on networks to which it is connected and one of its functions is to forward or copy frames from one network to another, based in part on its observation of frame destination and source addresses. Because the networks are not synchronized, a bridge must usually store any copied frames in a buffer (not shown); then transmit them when it next has an opportunity, i.e. after capturing the token on the destination ring network. In block 50, the bridge checks to determine if any frame or frames have been copied for subsequent transmission on ring 10. If the answer is yes, the bridge enters ring transmit logic 54 to initiate the transmission, and returns to the processing loop as shown, to check for any further transmission activity in block 50. In a parallel processing loop, transmission activity for the other ring 20 is checked in block 52 and, if any, is transmitted onto the ring as shown in block 56.

Similarly, the bridge checks to determine whether it is receiving a bit stream from rings 10 and 20, in blocks 58 and 60, respectively. There will normally be periods when the bridge is receiving nothing from its networks, but will continue seeking activity in its transmission function. When there is receiver activity, the bridge also enters ring receive logic for the appropriate ring, as indicated at 62 and 64, respectively.

Figure 3B:
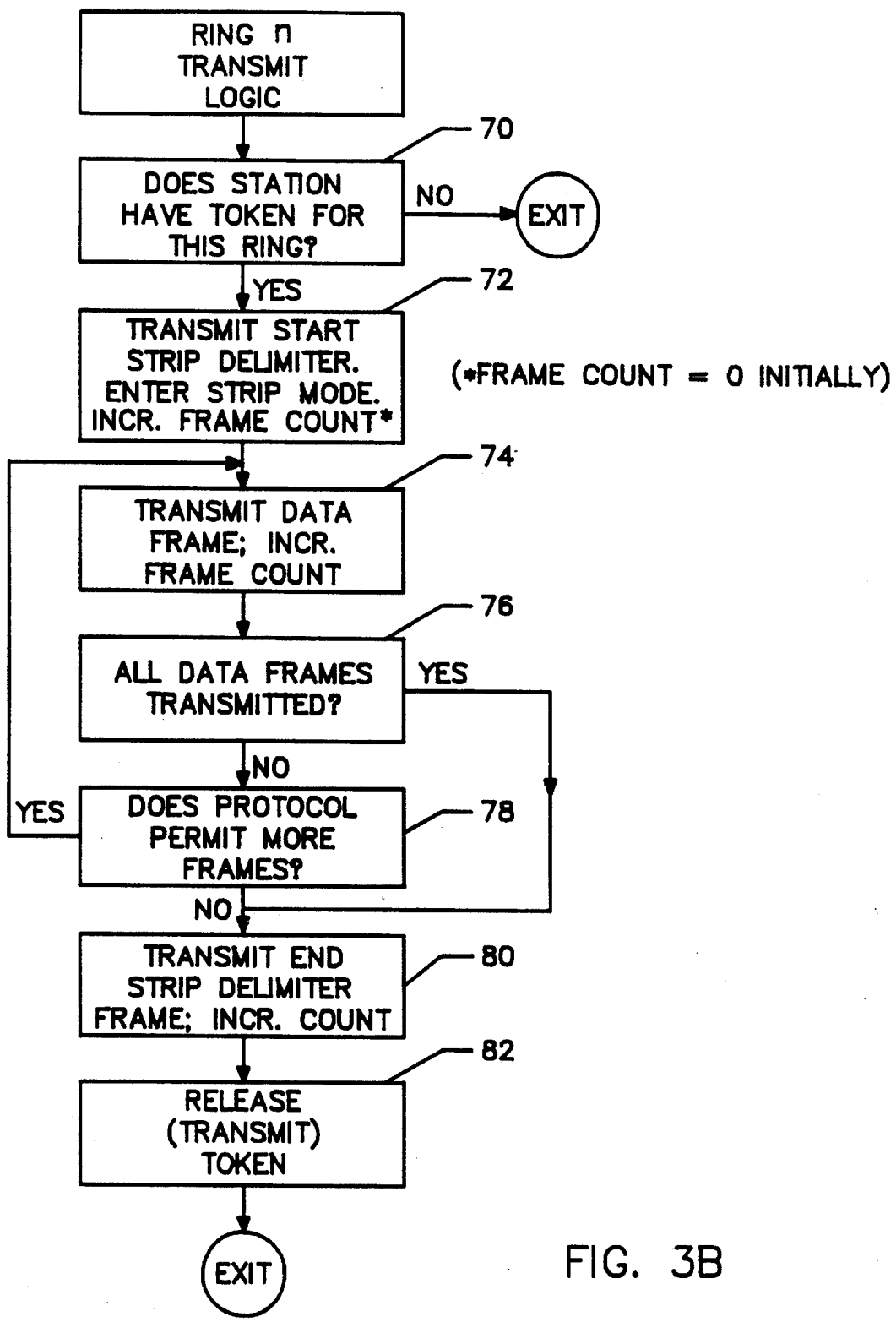

Although FIG. 3A illustrates the inherent concurrency of bridge operations, the remaining figures are necessarily simplified in this regard. For purposes of explanation, FIGS. 3B–3E show unbroken sequences of operations in the transmit logic 54, 56 and the receive logic 62, 64. To achieve concurrency of operation in a single processor would require that the transmit and receive functions be time-shared to a greater extent than is shown, but this is difficult to depict in flowchart form. For example, frame transmitting operations are shown in FIG. 3B as encompassing multiple transmissions of frames before a return is made to the main processing loop of FIG. 3A. However, for concurrency of operation a return would need to be made to the main processing loop at least after initiating each frame transmittal. Concurrency of this kind can be obtained by any of a number of conventional techniques, such as by using a system of hardware interrupts to control frequent exit from and return to the processing steps shown in the figures.

FIG. 3B shows the transmit logic 54, 56 for one of the rings. It will be understood that this control logic may be implemented as multiple copies, with one copy for each ring, or (if a single module of control logic, in hardware or software form,) is provided with the ability to distinguish which of the network rings it is processing at any point in time.

The processing sequence defined by FIG. 3B is reached only when there is at least one information frame to transmit on a ring. First it is determined whether the station has the token for this ring (block 70), and, if not, an immediate exit is taken to the main processing sequence of FIG. 3A. If the token has already been captured, a start strip delimiter is first transmitted, as shown in block 72. At this point, the station enters the "strip mode" for the particular ring being processed. In strip mode, the receive logic of the station automatically strips incoming frames as they are received from the ring, without regard to their source addresses, and excepting only the special cases of tokens and frames used in token ring intitialization. The token ring protocol is such that a station, having transmitted a message onto the ring, can expect that the very next frame it receives will be the first frame of its own message. Any frames that precede the frames originated by this station should, if the ring is operating properly, be stripped off by other stations before they reach this station.

After transmitting the start strip delimiter, a station frame count for this ring is optionally incremented by one. Initially the count is zero, and it is incremented by one for each transmitted frame, including (optionally) start strip and end strip delimiter frames. Then each of the information frames is transmitted in turn, as shown in blocks 74, 76, and 78, until it is determined in block 76 that all of the information frames have been transmitted, or that the protocol does not permit the transmission of more frames (block 78). After each frame is transmitted, the frame count is incremented by one. An end strip delimiter frame is then transmitted and the frame count optionally incremented (block 80). Finally the token is released by the station, i.e. the token is transmitted onto the ring (block 82), and exit is made to continue other processing by the bridge station.

Figure 3C:
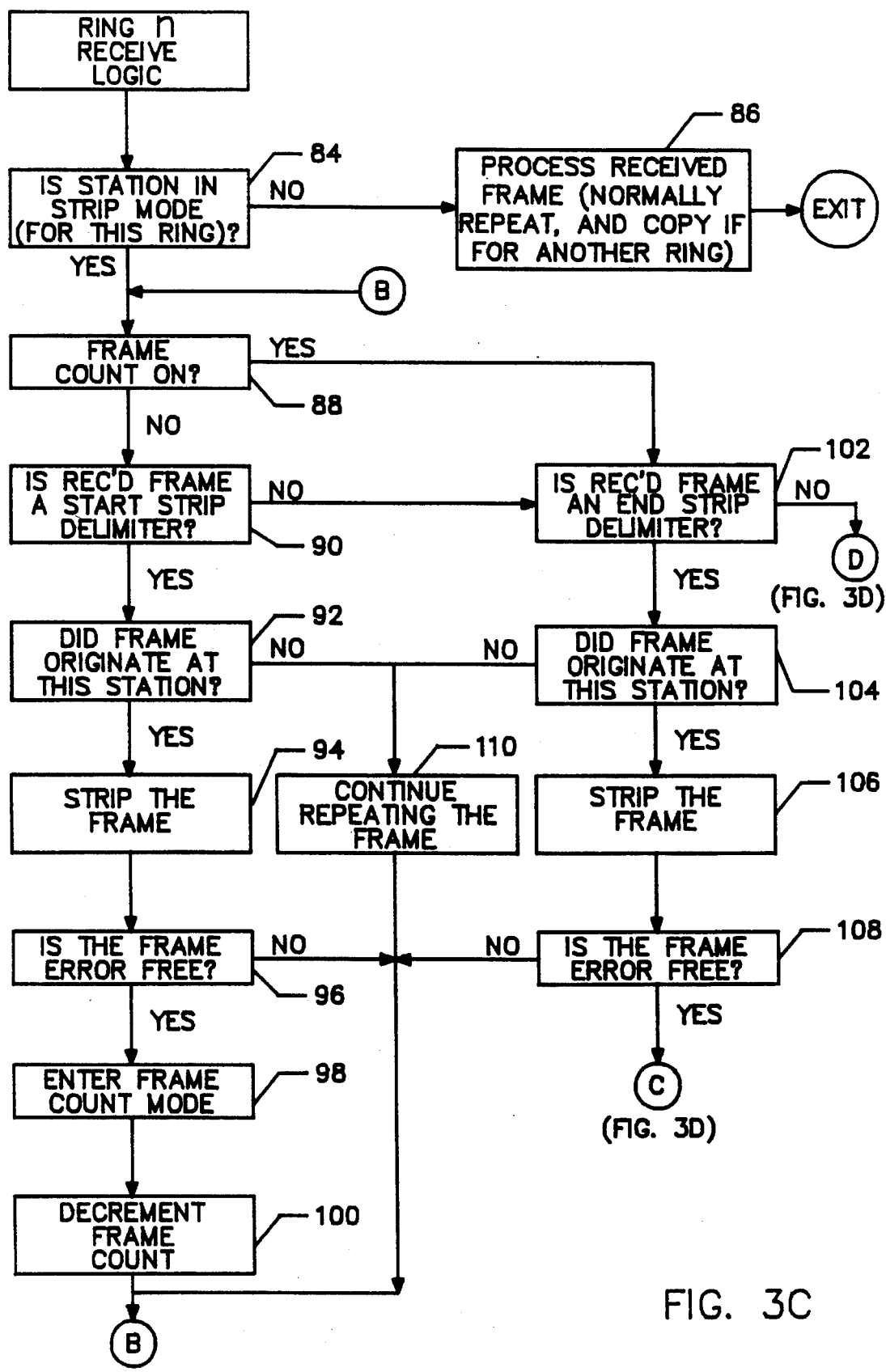
Figure 3E:
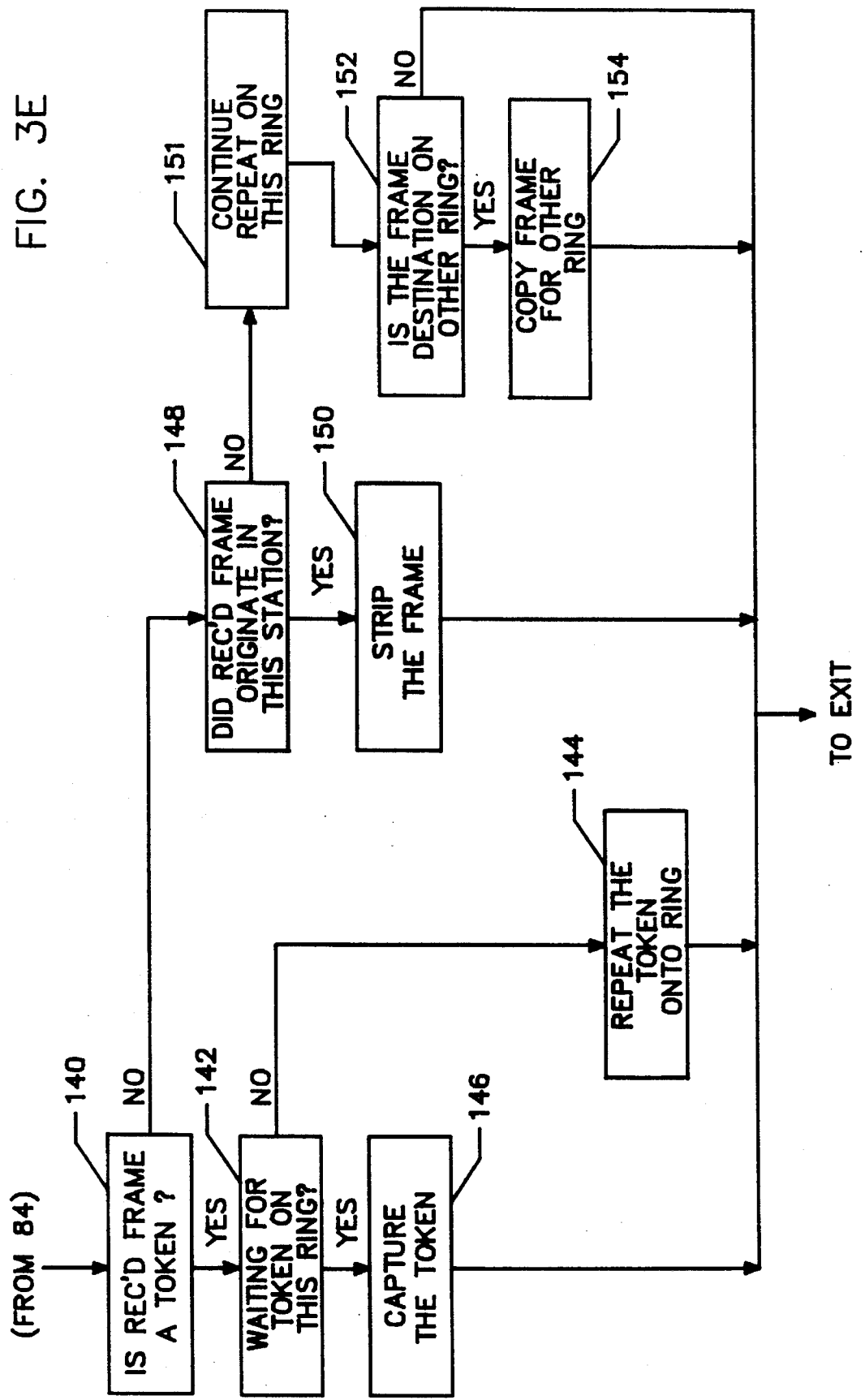
Figure 4A:
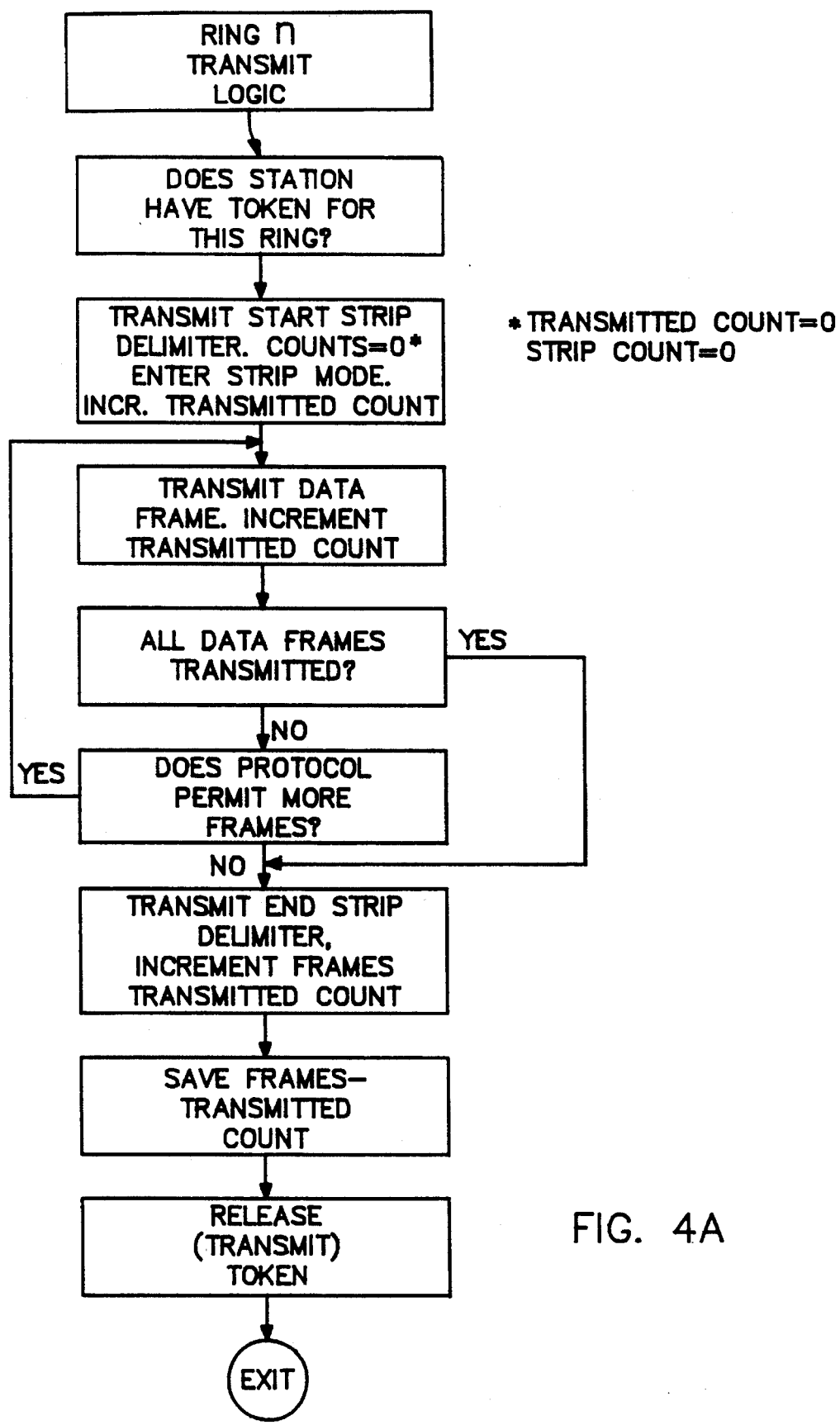
FIGS. 4A–4D together comprise a flowchart of transmit and receive logic in accordance with an alternate embodiment of the invention.
Figure 4B:
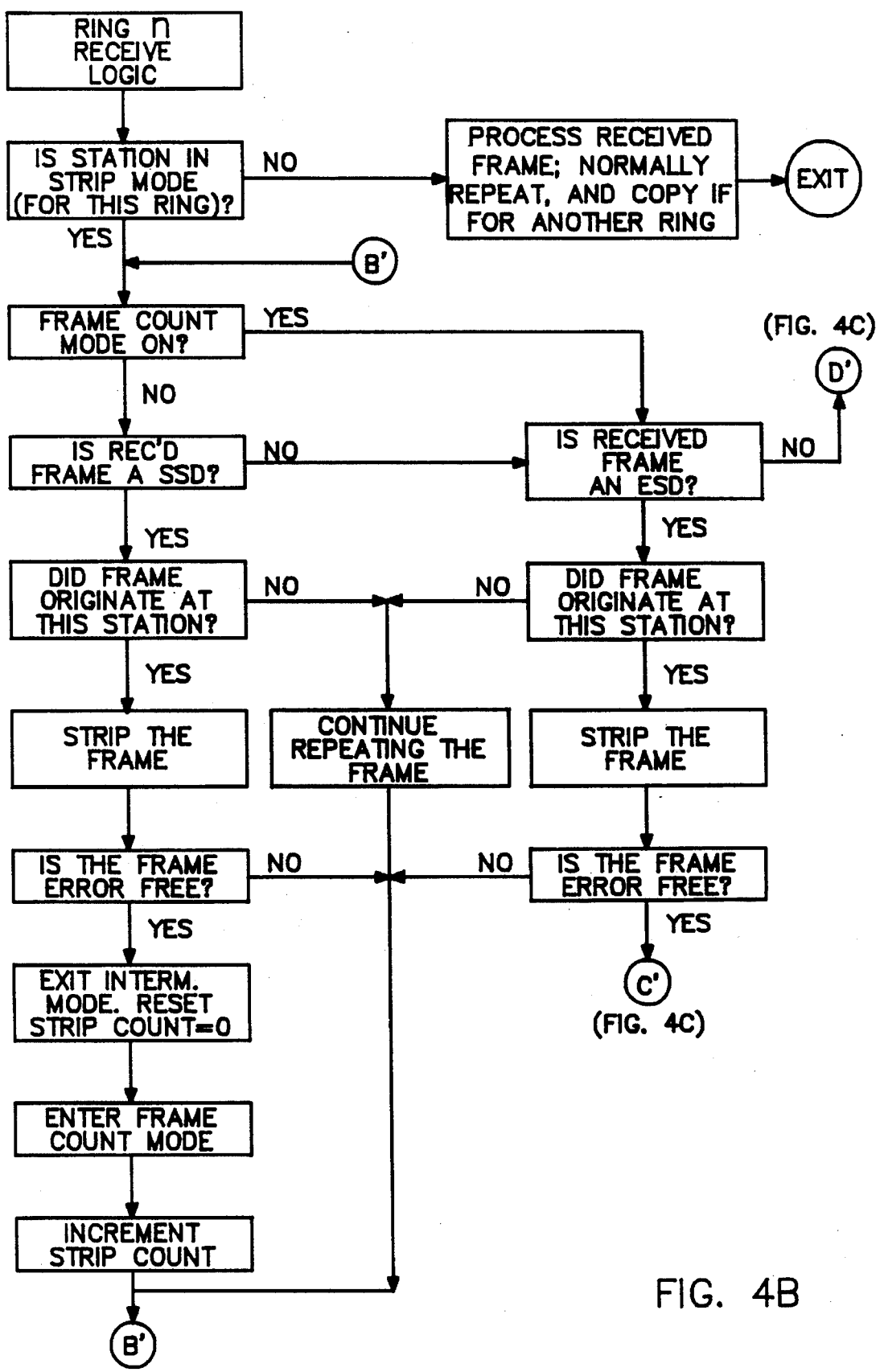
Figure 4C:
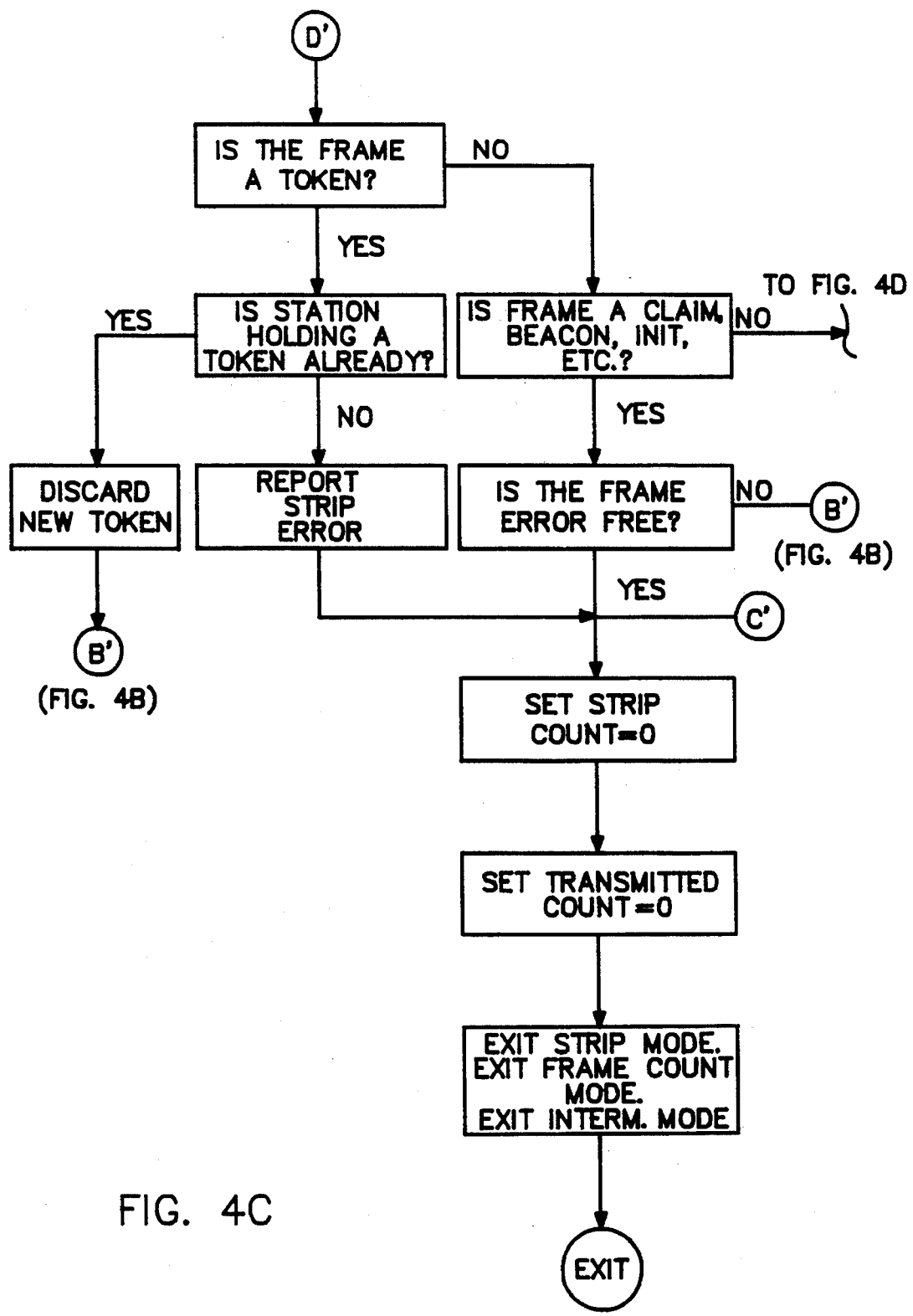
Figure 4D:
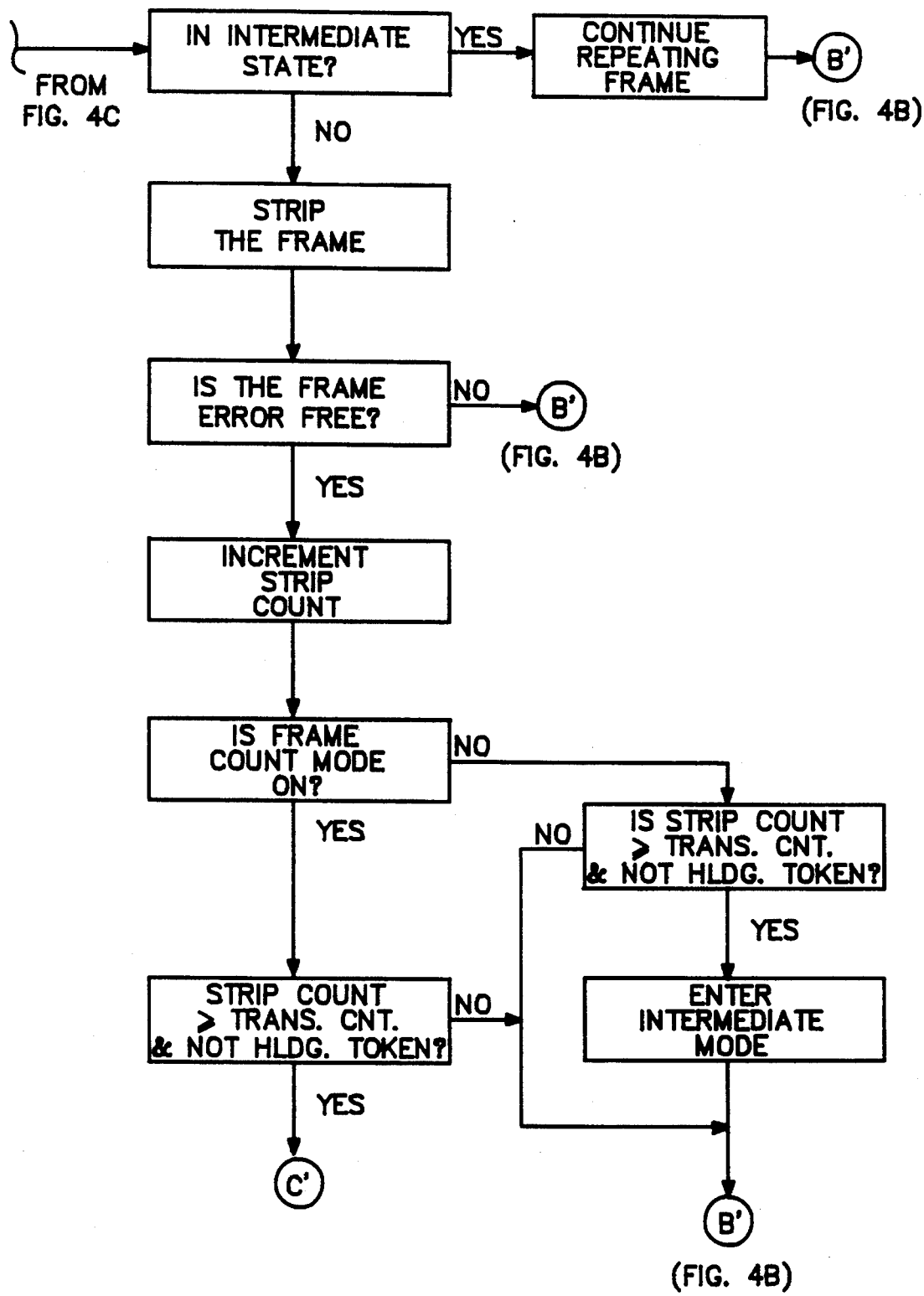

The receive processing logic is somewhat more complicated, and is shown in simplified form in FIGS. 3C–E. There are two modes or states that govern operation of the receive processing logic: the strip mode, which is entered when the first frame is transmitted, and a frame count mode. When in the frame count mode, the station decrements the frame count by one whenever a received frame is stripped. When not in the frame count mode, the frame count is not decremented upon frame stripping. Initially, on first entering the receive processing logic after initiating a transmission, the station is not in the frame count mode, but is in the strip mode. Note, however, that the receive processing logic is also entered, on other occasions, to process received frames when there has been no transmitting activity. The first determination made by the receive processing logic is whether or not the station is in strip mode for this ring, as indicated in block 84. If the station is not in strip mode, a received frame is processed as indicated in block 86. For information frames, this will normally involve repeating the frame, i.e. transmitting it back onto the ring, copying the frame for transmission onto one or more other rings, and taking other special action as detailed further in FIG. 3E. The standard frame stripping means, using source addresses, is followed.

If the station is in strip mode, as determined in block 84, it is next determined whether the station is in frame count mode (block 88). If not, the incoming frame is checked, in block 90, to determine if it is a start strip delimiter, which indicates the start of a sequence of frames. If a start strip delimiter is found, it is next determined whether the received frame originated in this station (block 92). If it did, it is stripped, in accordance with the standard source address stripping mode (block 94). If the received frame is then found to be error free (block 96), the frame count mode is entered (block 98), the frame count is decremented (block 100), and a return is made to block 88, through connector B, to process the next frame. At this point, the question posed in block 88 will determine that the the frame count is on, and the next and all successive frames are checked for the presence of an end strip delimiter (block 102).

If the received frame is not an end strip delimiter, processing continues, through connector D, in FIG. 3D, to be described shortly. If the received frame is an end strip delimiter, it is next determined whether the frame originated at this station (block 104). If so, the frame is stripped (block 106), and if it is error free (block 108) processing continues, via connector C, in FIG. 3D.

If the received start strip delimiter frame did not originate at this station, as determined in block 92 or block 104, the station continues repeating the frame, as indicated in block 110, and returns to block 88 to examine the next received frame. Similarly, if a received start or end strip delimiter frame is not error free, as determined in block 96 or block 108, there is a return to block 88 to examine the next received frame.

The entry point D for processing in FIG. 3D is reached only if one of two conditions is satisfied, as determined by the processing described with reference to FIG. 3C. One condition is that the station is in strip mode and in frame count mode, and that a received frame is not an end strip delimiter. The other condition is that the station is in strip mode but not in frame count mode, and that the received frame is neither a start strip delimiter nor an end strip delimiter. In either case, the next test performed on the received frame is to determine if it is a token (block 112). If it is not a token, the frame is stripped (block 114), and if the stripped frame is error free (block 116), a check is made to determine if it is a claim, beacon, initialization or error recovery frame (block 118). If not, and if the station is in frame count mode (block 119), the frame count is decremented (block 120), but not below zero. If the frame count is not zero (block 122), or if not in the frame count mode (block 119), return is made to block 88 through connector B, to process the next received frame. If the frame count reaches zero and the station is not holding a token, exit is made from the strip mode and the frame count mode (block 124).

In the case of detection of an error free claim, beacon, initialization frame or error recovery frame in block 118, the frame count is set to zero (block 126) and the strip mode and frame count modes are exited (block 124). In the case of detection of a token in block 112, if the station is already holding a token (block 128), the new token is discarded (block 130), and a return is made to block 88 through connector B, to process the next received frame. If the station is not already holding a token (block 128), a strip error is reported (block 132), and processing continues in block 126, i.e. the frame count is set to zero and exit is made from the strip mode and the frame count mode.

Normal processing of a received frame, when the station is not in strip mode, is shown in more detail in FIG. 3E. If the received bit stream is a token, as determined in block 140, the station determines (in block 142) whether it needs to capture the token, i.e. whether one or more frames are ready to be transmitted on this ring. If the there is no need to capture the token, it is repeated onto the ring, as indicated in block 144. Otherwise, the token is captured (block 146). While not explicitly shown in FIG. 3E, it will be understood that, if a token is received while a station already has a previously captured token, an error condition exists because of the apparent presence of the second token. In most token ring protocols, this calls for the stripping of the second received token, in the same manner as shown in FIG. 3D.

If the received frame is not a token, it is next determined whether the frame originated at this station (block 148). If so, the frame is stripped (block 150), in the standard source-based stripping mode. An optional technique of the invention is for the transmit logic to include multiple end strip delimiter frames for additional security. The first correctly received end strip delimiter will terminate stripping, but the others still need to be stripped as they are received. Block 150 in FIG. 3E performs this function, as well as that of stripping any other frames originated in this station but not previously stripped for some reason.

If the received frame did not originate in this station, it must be repeated back onto the ring (block 151) and, in a bridge station, copied for transmittal onto other rings. Each bridge maintains a database of station locations, i.e. the bridge learns a station location (which ring of network) based on the source address contained in each frame that it receives. Using this database, the bridge decides whether or not to copy received frames for transmittal onto other networks. For example, if a bridge receives a frame containing source and destination addresses that are known to be on the same ring, the bridge need not copy the frame for transmission onto other rings. Likewise, the bridge may copy a frame for transmission onto just one other ring, if it knows that the destination station can be reached through that ring, or it may copy a frame for transmission onto all other rings, if it does not recognize the destination address at all. Block 152 determines whether the destination of the received frame is on another ring. If so, the frame is copied, in block 154, for transmission onto the other ring or rings.

Alternate Embodiment

An alternate approach to frame stripping involves the use of two separate frame counts when processing received frames. When transmitting frames, a frame count is incremented, as usual, with optional incrementing of the count for start strip delimiter and end strip delimiter frames. The total number of transmitted frames is retained for use in the receive logic. Upon receiving frames, two count values are maintained:

(a) a "currently expected" frame count equal the number of currently outstanding frames. This count is decremented for each error free frame that is received and correctly stripped;

(b) the count of frames actually transmitted is used for a comparison.

Upon receipt of a start strip delimiter, and entering the frame count mode, this internally maintained count (b) is reloaded back into the "currently expected" count (a). The stop strip conditions remain as before:

(1) Currently expected count is zero.
(2) End strip delimiter received.
(3) Token received while not holding another.
(4) Ring initialization.

The only difference in this regard is that if the count goes to zero prior to encountering a start strip delimiter frame the station enters an intermediate state rather than a completely terminating stripping. Therefore, when a string of NOFs precedes the start strip delimiter frame, the receive logic will strip a limited number of them, up to the count of frames actually transmitted. Then the receive logic will enter the intermediate state, and no more frames will be stripped until a start strip delimiter frame is received. At this point the "currently expected" count, (a), is reloaded with the frames-transmitted count, (b), and stripping continues or resumes until one of the four stop strip conditions occurs.

This alternative technique allows a limited number of NOFs to be stripped, but provides that the stripping process be started afresh on the detection of a start strip delimiter frame. Therefore, NOFs are not stripped at the expense of information frames that follow the start strip delimiter frame. Another important advantage is that, if the start strip delimiter frame should be lost, only a limited number of frames will be stripped before stripping is terminated. Thus, overstripping errors are minimized.

This alternative form of the invention may also be implemented in a slightly different, and somewhat simpler manner by incrementing a "strip count" in the receive logic, instead of decrementing the same count that was incremented by the transmit logic. In the transmit logic a transmit counter is incremented for each frame transmitted, and then the total of this count is saved for use as the transmit count in the receive logic. In processing received frames, the strip count is initially zero and is incremented for each error free frame that is received and stripped. Instead of testing for a zero frame count, the appropriate test is whether the strip count is equal to or greater than the transmit count. An initial bias may be added to the transmit count to remove a greater number NOFs. When a start strip delimiter frame is received, the strip count is reset to zero and stripping of the transmitted frames begins. This form of implementation is assumed in the flow charts of FIGS. 4A–4D, which shown the detailed transmit and receive logic in accordance with the alternate embodiment.

Stripping Errors

During the course of processing a received bit stream, the receive processing logic provides an indication of strip errors. A strip error occurs when a token is received while the station is in strip mode and is not currently holding a token. For example, if the station has just transmitted multiple information frames, followed by the token, the station is in the strip mode, waiting for the first or some subsequent frame to strip from the ring. As discussed, stripping will normally be terminated upon receipt of the first end strip delimiter frame, which will be followed by the token. If a token is received prior to termination of the strip mode, stripping is prematurely terminated, and an understripping error is said to have occurred. Detection of this error is made in block 132 of FIG. 3D. Repeated occurrence of understripping errors can cause degradation of the operation of the ring network, and possibly the entire extended network of multiple LANs interconnected by bridges. Continued indication of understripping errors is provided so that network managers can take appropriate action.

An alternative to the use of the start strip delimiter frame to remove No-Owner Frames (NOFs) is to provide that the frame counter have a preset value greater than zero. It will be recalled that multiple circulating NOFs are not reduced in number by a stripping approach that does not use the start strip delimiter. Instead, stripping removes as many frames as were transmitted, and also removes the end strip delimiter by other means, leaving only one fewer circulating NOFs. If the frame counter were to be preset to a bias of +n, the stripping operation would result in the removal of n+1 NOFs. Presetting the frame count does not affect correct operation in a ring without NOFs. In a ring that is prone to the occurrence of NOFs, this approach provides a simple solution and a significant improvement in performance. When fewer or no NOFs are present, the preset bias does not result in overstripping, since stripping is terminated upon detection of the first end strip delimiter, rather than by a zero frame count. Ideally, this approach should permit the preset counter bias to be easily changed, based on observation of the number of circulating NOFS on the ring. In the alternate embodiment shown in FIGS. 4A–4C, a limited number of NOFs is removed prior to the detection of a start strip delimiter frame, and overstripping is minimized even if both start strip and end strip delimiters are missing.

Another alternative implementation of the invention addresses a practical problem that arises from the use of frame counters in each station. In some networks, the number of frames that can be transmitted before releasing the token is such that the frame counters may have to be extremely large. Two alternative solutions may be employed. First, instead of counting every frame, the station may count instead only special delimiter frames that are inserted every few frames, such as after every fifth frame. Frame counter capacities can then be reduced by a like factor, with only a slight increase in network overhead caused by the transmission of the additional delimiter frames.

A second solution to the problem of large frame counters is to base activation of the strip mode on a measure of time rather than a count of frames. The latency delay of the network is generally a known quantity, although it may vary as the network configuration is changed. The time taken to complete a multiframe transmission may be measured by the station. Thus the time to terminate stripping can be estimated as the sum of the latency time and the time to complete transmission. Overstripping is prevented by the presence of one or more end strip delimiter frames. Understripping is possible if the latency time is longer than estimated. However, the use of time-based stripping termination is a very simple solution to the problem of extraneous No-Owner Frames, and requires no counters or complex counter processing logic.

Using a timer to terminate stripping is also a complementary technique, for use with any of the other described stripping approaches. Even the most carefully designed frame stripping mechanism using delimiter frames and frame counting techniques is subject to overstripping errors under certain condition. A timer provides a reliable fallback position to prevent overstripping in the event that the primary technique fails to terminate stripping.

It will be appreciated from the foregoing that the present invention represents a significant advance in the field of token ring networks. In particular, the invention provides a novel approach to the stripping of frames at bridges and other stations connected to a token ring network. Problems arising from the presence of multiple circulating No-Owner Frames are alleviated by the use of a start strip delimiter frame, or by a preset frame count, and an indication is provided of understripping error conditions. Further, large frame counters may be reduced in capacity by the use of special delimiter frames, or eliminated entirely if stripping termination is based on elapsed time.

It will also be appreciated that, although several embodiments of the invention have been described in detail for purposes of illustration, various modifications may be made without departing from the spirit and scope of the invention. It will be understood, for example, that instead of counting frames, the transmit and receive logic described above could count bytes or other convenient increments of data. Accordingly, the invention is not to be limited except as by the appended claims.

Figure 8:
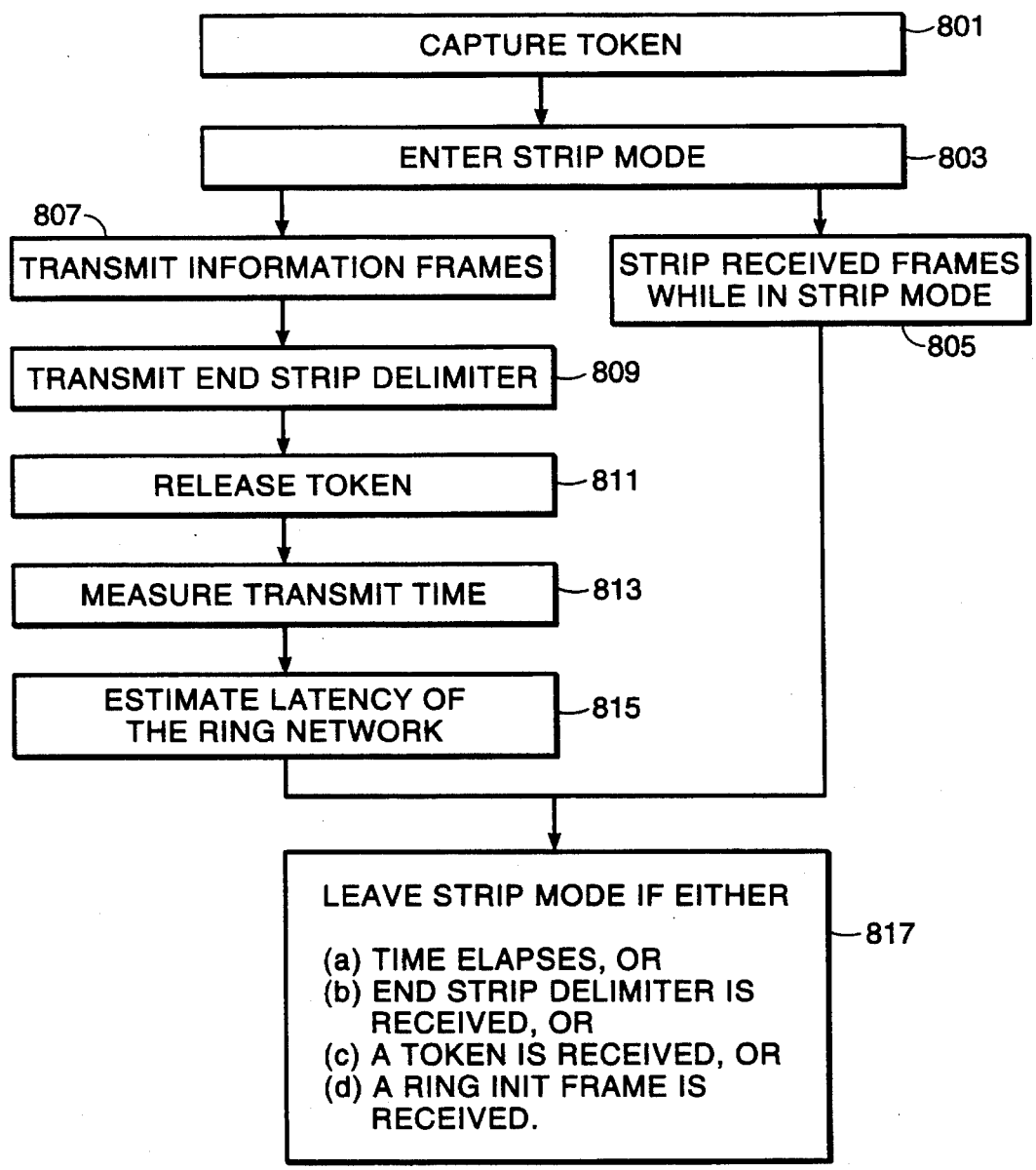
FIG. 8 is a functional block diagram showing the steps of a method for operating a station connected to a token ring network, to permit stripping of frames from the network.

FIG. 8 shows the steps of a method of operating a station connected to a token ring network, to permit stripping of frames from the network. The method of FIG. 8 includes a first step 801 of capturing a token from the network, the token conveying the right to transmit onto the ring. The method of FIG. 8 further includes a step 807 of transmitting onto the network one or more information frames, followed by transmission of an end strip delimiter frame in step 809, and releasing the token in step 811. The method of FIG. 8 further includes entering a strip mode in step 803 after capturing the token in step 801. In step 805, following step 803, the station receives frames from the network and, if in the strip mode, strips the frames.

In step 813, following step 811, the station measures the time for the station to transmit, from the time of transmitting the first frame to the time that the token is released. In step 815, the station obtains an estimate of the latency time of the ring network, from the time of transmission of a frame by the station to the time of receipt of the same frame by the same station. In step 817, following step 815 and step 805, the station leaves the strip mode if either (a) there is an elapsed time, after entering the strip mode, equal to the sum of the transmitting time and the latency time obtained in the preceding two steps, or (b) an end strip delimiter frame originated by this station is received, or (c) a token is received after the token was released, or (d) a ring initialization frame is received. In the method of FIG. 8, extraneous frames that may precede the start strip delimiter will be stripped, and in most cases the entire set of transmitted frames will be stripped in spite of the presence of extraneous frames.

We claim:

1. A station for connection to a computer network, comprising:

transmitting means for transmitting onto the network a number of information frames, preceded by a start strip delimiter frame and followed by an end strip delimiter frame;

receiving means for receiving frames and other information from the network, and processing the received frames, including frame stripping means for stripping from the network information frames received during a time period that begins no later than when the transmitting means begins transmitting the start strip delimiter frame;

stripping termination means, for detecting the occurrence of any of a number of preselected conditions intended to terminate operation of the frame stripping means;

frame counting means, for recording the number of frames transmitted by the transmitting means and the number of frames received and stripped by the frame stripping means, wherein one of the conditions terminating stripping is that the number of frames transmitted is equal to the number of frames received and stripped; and means for disabling the frame counting means from counting stripped frames, wherein the stripped frames are not counted until after receipt of the start strip delimiter frame, whereby any extraneous frames received prior to the start strip delimiter frame will be stripped but not counted as stripped, and the existence of any such extraneous frames does not adversely affect network performance.

2. A station as defined in claim 1, wherein the stripping termination means further includes:

means for terminating stripping upon the receipt of said end strip delimiter frame, whereby stripping is terminated either upon receipt of said end strip delimiter frame or upon counting equal numbers of transmitted and stripped frames.

3. A station as defined in claim 1, wherein said computer network uses a token protocol, and wherein the stripping termination means further includes:

means for terminating stripping upon the receipt of a token when no token is currently held by the station.

4. A station as defined in claim 1, wherein said computer network includes a protocol having a special frame reinitializing said computer network, and wherein the stripping termination means further includes:

means for terminating stripping upon the receipt of said special frame reinitializing the network.

5. A station as defined in claim 1, and further comprising:

means for indicating understripping error conditions in which stripping is prematurely terminated before all of the transmitted frames have been received.

6. A station as defined in claim 5, wherein said computer network uses a token protocol, and wherein the means for indicating understripping errors includes:

means for detecting the receipt of a token while the frame stripping means is operative, and while the station is not holding a token.

7. A station for connection to a computer network, comprising:

transmitting means for transmitting onto the network a number of information frames, preceded by a start strip delimiter frame and followed by an end strip delimiter frame;

receiving means for receiving frames and other information from the network, and processing the received frames, including frame stripping means for stripping from the network information frames received during a time period that begins no later than when the transmitting means begins transmitting the start strip delimiter frame; and stripping termination means, for detecting the occurrence of any of a number of preselected conditions intended to terminate operation of the frame stripping means, the stripping termination means including counting means for determining when to terminate stripping;

wherein the receiving means includes means for processing extraneous frames that may be received prior to the frames transmitted by this station, to avoid understripping of frames.

8. A station as defined in claim 7, wherein:

the counting means includes means for counting transmitted frames, means for counting received frames and means for counting stripped frames, and one of the conditions for termination of stripping is the counting of equal numbers of transmitted and received frames, and the means for processing extraneous frames includes means for enabling the means for counting received frames and the means for counting stripped frames, in response to receipt of the start strip delimiter frame, whereby any extraneous frames received prior to the start strip delimiter frame will be stripped but not counted as stripped, and the existence of any such extraneous frames will not adversely affect network performance.

9. A station as defined in claim 8, wherein:

the means for counting transmitted frames and the means for counting received frames are both responsive only to special delimiter frames transmitted after every set of n frames, where n is a positive integer, whereby smaller counts are then needed to keep track of transmitted and received frames.

10. A station as defined in claim 7, wherein:

the counting means includes timing means for providing an estimated stripping termination time based on an estimated network latency or delay time for a transmitted frame to traverse the entire network, wherein one of the conditions for terminating stripping is the expiration of the estimated stripping termination time.

11. A method of operating a station connected to a token ring network, said token ring network including a protocol for using a ring initialization frame to initialize said token ring network, said method for stripping of frames from the network, the method comprising the steps of:

capturing a token from the network, the token conveying the right to transmit onto the ring;

transmitting onto the network a number of information frames, preceded by a start strip delimiter frame and followed by an end strip delimiter frame and the released token;

entering a strip mode after capturing the token;

receiving frames from the network and, if in the strip mode, stripping the frames;

counting frames transmitted onto the network;

detecting receipt of the start strip delimiter frame;

counting frames stripped from the network after receipt of the start strip delimiter frame; and leaving the strip mode if either (a) the number of frames counted as transmitted is equal to the number of frames counted as stripped, or (b) an end strip delimiter frame originated by this station is received, or (c) a token is received after the token was released, or (d) a ring initialization frame is received;

whereby extraneous frames that may precede the start strip delimiter frame will be stripped but not counted, without regard to their source addresses, and the entire set of transmitted frames will be stripped in spite of the presence of the extraneous frames.

12. A method as defined in claim 11, and further comprising the steps of:

detecting any understripping errors and providing an indication thereof.

13. A method as defined in claim 12, wherein the step of detecting any understripping errors includes:

detecting the receipt of a token when the station is in strip mode and is not holding a token.

14. A method of operating a station connected to a token ring network, said token ring network including a protocol for using a ring initialization frame to initialize said token ring network, said method for stripping of frames from the network, the method comprising the steps of:

capturing a token from the network, the token conveying the right to transmit onto the ring;

transmitting onto the network a number of information frames, preceded by a start strip delimiter frame and followed by an end strip delimiter frame and the released token;

entering a strip mode after capturing the token;

receiving frames from the network and, if in the strip mode, stripping the frames;

measuring the time for the station to transmit, from the time of transmitting the first frame to the time that the token is released;

obtaining an estimate of the latency time of the ring network, from the time of transmission of a frame by a station to the time of receipt of the same frame by the same station; and leaving the strip mode if either (a) there is an elapsed time, after entering the strip mode, equal to the sum of the transmitting time and the latency time obtained in the preceding two steps, or (b) an end strip delimiter frame originated by this station is received, or (c) a token is received after the token was released, or (d) a ring initialization frame is received;

whereby extraneous frames that may precede the start strip delimiter frame will be stripped, and the entire set of transmitted frames is stripped in spite of the presence of extraneous frames.

15. A method as defined in claim 14, and further comprising the steps of:

detecting any understripping errors and providing an indication thereof.

16. A method as defined in claim 15, wherein the step of detecting any understripping errors includes:

detecting the receipt of a token when the station is in strip mode and is not holding a token.

17. A method of operating a station connected to a token ring network, said token ring network including a protocol for using a ring initialization frame to initialize said token ring network to permit stripping of frames from the network, the method comprising the steps of:

capturing a token from the network, the token conveying the right to transmit onto the ring;

transmitting onto the network a number of information frames, preceded by a start strip delimiter frame and followed by an end strip delimiter frame and the released token;

entering a strip mode after capturing the token;

receiving frames and frame fragments from the network and, if in the strip mode, stripping said received frames and frame fragments;

counting all frames transmitted onto the network subsequent to said capture of said token;

detecting receipt of the start strip delimiter frame;

counting said received frames and frame fragments stripped from the network; and leaving the strip mode if either (a) the number of said frames counted as transmitted is less than the number of said received frames and frame fragments counted as stripped, by a number k, where k is a preselected integral number or (b) an end strip delimiter frame originated by this station is received, or (c) a token is received after the token was released, or (d) a ring initialization frame is received;

whereby as many as k received frames and frame fragments that are received prior to the start strip delimiter frame are stripped, and all said frames transmitted onto said network after said capture of said token are stripped in spite of the presence of said as many as k received frames and frame fragments that are received prior to the start strip delimiter frame.

18. A method of operating a station connected to a token ring network, said token ring network including a protocol for using a ring initialization frame to initialize said token ring network, said method for stripping of frames from the network, the method comprising the steps of:

capturing a token from the network, the token conveying the right to transmit on the ring;

transmitting onto the network a number of information frames, preceded by a start strip delimiter frame and followed by an end strip delimiter frame and the released token;

entering a strip mode after capturing the token;

receiving frames from the network and, if in the strip mode, stripping the frames without regard to their source addresses;

detecting receipt of the start strip delimiter frame;

continuing to strip frames received after the start strip delimiter;

leaving the strip mode if (a) an end strip delimiter frame originated by this station is received, or (b) a token is received after the token was released, or (c) a ring initialization frame is received;

whereby extraneous frames that may precede the start strip delimiter frame will be stripped, without regard to their source addresses, and the entire set of transmitted frames will be stripped in spite of the presence of the extraneous frames.

19. A method of operating a station connected to a token ring network, said token ring network including a protocol for using a ring initialization frame to initialize said token ring network, said method for stripping of frames from the network, the method comprising the steps of:

capturing a token from the network, the token conveying the right to transmit onto the ring;

transmitting onto the network a number of information frames, preceded by a start strip delimiter frame and followed by an end strip delimiter frame and the released token;

entering a strip mode after capturing the token;

receiving frames from the network and, if in the strip mode, stripping the frames without regard to their source addresses;

counting frames transmitted onto the network;

saving the total count of transmitted frames when transmission is complete;

counting received frames stripped from the network;

if the count of frames received and stripped prior to the start strip delimiter reaches the total count of transmitted frames, terminating stripping of subsequent frames;

detecting receipt of the start strip delimiter frame;

resetting the count of stripped frames to zero upon detection of the start strip delimiter;

counting frames stripped from the network after detection of the start strip delimiter frame;

continuing stripping of frames received after the start strip delimiter; and leaving the strip mode if either (a) the number of frames counted as transmitted is equal to the number of frames counted as stripped, or (b) an end strip delimiter frame originated by this station is received, or (c) a token is received after the token was released, or (d) a ring initialization frame is received;

whereby extraneous frames that precede the start strip delimiter frame are stripped, regardless of their source addresses, and the entire set of transmitted frames are stripped.

20. A station on a computer network, said station comprising:

means for granting permission to said station to transmit at least one frame onto said network;

means, responsive to said granting of permission, for transmitting a start strip delimiter frame, one or more information frames, and an end strip delimiter frame onto said network;

means for counting each frame transmitted onto said network;

means for stripping at least one frame from said network, and for counting each frame stripped;

means for beginning stripping in response to said granting of permission to said station to transmit said at least one frame onto said network; and, means for ending stripping when a stop strip condition is satisfied, said condition being satisfied,
when a number of frames stripped equals a number of frames transmitted, or
when said end strip delimiter frame is received by said station, or,
when a predetermined frame type is received by said station; and, means for detecting a stripping error upon the occurrence of an event as follows,
the event of ending stripping when the number of frames transmitted does not equal the number of frames stripped, or
the event of ending stripping by any condition other than receipt of said end strip delimiter frame.

21. The apparatus as in claim 20 wherein said means for stripping counts only error free frames that are stripped.

22. The apparatus as in claim 20 wherein said stop strip condition is satisfied by receipt of said end strip delimiter frame only when said received end strip delimiter frame is error free.

23. The apparatus as in claim 20, wherein said computer network uses a token ring protocol, and wherein said predetermined frame type is a token.

24. The apparatus as in claim 20, wherein said computer network supports error recovery frames, and wherein said said predetermined frame type is an error recovery frame.

25. The apparatus as in claim 20, wherein said computer network is a token ring network having beacon frames, and wherein
said predetermined frame type is a beacon frame.

26. The apparatus as in claim 20, wherein said computer network is a token ring network including claim token frames, and wherein
said predetermined frame type is a claim token frame.

27. The apparatus as in claim 20, wherein said computer network is a token ring network and supports ring initialization frames, and wherein
said predetermined frame type is a ring initialization frame.

28. The apparatus as in claim 20, wherein said computer network supports error recovery frames, and wherein said predetermined frame type is an error recovery frame.

29. A method for operating a station on a computer network, comprising:

granting permission to said station to transmit onto said network;

means, responsive to said granting of permission, for transmitting a start strip delimiter frame, one or more information frames, and an end strip delimiter frame onto said network;

counting a total number of said frames transmitted onto said network;

stripping all frames received from said network, and counting a total number of frames stripped subsequent to receipt of said start strip delimiter frame;

beginning stripping in response to said granting of permission to said station to transmit onto said network;

ending stripping when a stop strip condition is satisfied, said condition being satisfied,
when said total number of frames stripped equals said total number of frames transmitted, or,
when said end strip delimiter frame is received by said station, or,
when a predetermined frame type is received by said station; and, detecting a stripping error upon the occurrence of an event as follows,
the event of ending stripping when said total number of frames transmitted does not equal said total number of frames stripped, or
the event of ending stripping by any condition other than receipt of said end strip delimiter frame.

30. A station on a computer network, said station comprising:

means for granting permission to said station to transmit onto said network;

means for transmitting at least one start strip delimiter frame onto said network, followed by at least one information frame;

means for said station to transmit at least one end strip delimiter frame onto said network after transmission of said at least one information frame is finished;

means for counting a total number of frames transmitted onto said network;

means for beginning stripping in response to said granting permission to said station to transmit onto said network;

means, responsive to receiving said at least one start strip delimiter frame from said network, for counting a total number of frames subsequently stripped and keeping a result of said counting as a strip count;

means for ending stripping when a stop strip condition is satisfied, said condition being satisfied,
when said strip count equals said total number of frames transmitted, or,
when at least one of said at least one end strip delimiter frame is received by said station, or,
when a predetermined frame type is received by said station.

31. The apparatus as in claim 30 further comprising:

means for second counting each frame stripped, said second counting beginning in response to receipt of said grant of permission to said station to transmit, and for keeping a result of said second counting as a no owner frame count.

32. The apparatus as in claim 30 wherein said means for counting a total number of frames subsequently stripped counts only error free frames.

33. The apparatus as in claim 30 wherein said means for counting a total number of frames subsequently stripped is responsive only to an error free start strip delimiter frame received from said network.

34. The apparatus as in claim 30 wherein said condition in said means for ending stripping is satisfied by receipt of one of said at least one or more end strip delimiter frame only when said one said at least one or more end strip delimiter frame is error free.

35. The apparatus as in claim 30, wherein said computer network is a token ring, and wherein said predetermined frame type is a token.

36. The apparatus as in claim 30 wherein said computer network supports error recovery frames, and wherein said predetermined frame type is an error recovery frame.

37. The apparatus as in claim 30, wherein said computer network is a token ring network having beacon frames, and wherein said predetermined frame type is a beacon frame.

38. The apparatus as in claim 30, wherein said computer network is a token ring network including claim token frames, and wherein said predetermined frame type is a claim token frame.

39. The apparatus as in claim 30, wherein said computer network is a token ring network and supports rang initialization frames, and wherein said predetermined frame type is a ring initialization frame.

40. The apparatus as in claim 30, wherein said computer network supports error recovery frames, and wherein said predetermined frame type is an error recovery frame.

41. The apparatus as in claim 30 further comprising:

means for reporting said count as a number of no owner frames.

42. A method for operating a station on a computer network, comprising:

granting permission to said station to transmit onto said network;

transmitting at least one start strip delimiter frame onto said network, followed by at least one information frame;

said station to transmit at least one end strip delimiter frame onto said network after transmission of said at least one information frame is finished;

counting a total number of frames transmitted subsequent to said granting permission to said station to transmit said network;

beginning stripping in response to a grant of permission to said station to transmit said at least one frame onto said network;

counting a total number of frames stripped subsequent to receiving said at least one start strip delimiter frame from said network;

ending stripping when a stop strip delimiter condition is satisfied, said condition being satisfied,
when said total number number of frames stripped equals said total number of frames transmitted, or,
when at least one of said at least one end strip delimiter frame is received by said station, or,
when a predetermined frame type is received by said station.

43. A station on a computer network, said station comprising:

means for granting permission to said station to transmit onto said network;

means for transmitting at least one start strip delimiter frame onto said network, followed by at least one information frame;

means for said station to transmit at least one end strip delimiter frame onto said network after transmission of said at least one information frame is finished;

means for counting a total number of frames transmitted onto said network;

means for beginning stripping in response to said granting permission to said station to transmit onto said network;

means, responsive to receiving said at least one start strip delimiter frame from said network, for counting each subsequently stripped frame and keeping a result of said counting each subsequently stripped frame as a strip count;

means for ending stripping when a stop strip condition is satisfied, said condition being satisfied,
when said strip count equals said total number of frames transmitted, or,
when at least one of said at least one end strip delimiter frame is received by said station, or,
when a predetermined frame type is received by said station; and means for detecting a stripping error upon the occurrence of an event as follows,
the event of ending stripping when said total number of frames transmitted does not equal said strip count, or
the event of ending stripping by any condition other than receipt of at least one of said at least one end strip delimiter frame.

44. A method of operating a station on a computer network, comprising:

granting permission to said station to transmit onto said network;

transmitting at least one start strip delimiter frame onto said network, followed by at least one information frame;

transmitting at least one end strip delimiter frame onto said network after transmission of said at least one information frame is finished;

counting a total number of frames transmitted onto said network subsequent to said granting permission of said station to transmit;

beginning stripping in response to said granting permission to said station to transmit onto said network;

counting a total number of frames stripped and keeping a result of said counting said total number of frames stripped as a strip count, beginning said counting said total number of frames stripped in response to receiving said at least one start strip delimiter frame from said network;

ending stripping when a stop strip condition is satisfied, said condition being satisfied,
when said strip count equals said total number of frames transmitted, or,
when at least one of said at least one end strip delimiter frame is received by said station, or,
when a predetermined frame type is received by said station; and detecting a stripping error upon the occurrence of an event as follows,
    the event of ending stripping when said total number of frames transmitted does not equal said strip count, or
    the event of ending stripping by any condition other than receipt of at least one of said at least one end strip delimiter frame.

45. A station on a computer network, wherein said computer network token ring, said station comprising:
    means for determining a ring latency by measuring the time required for a frame transmitted by said station to travel around said network and be detected by said station;
    means, responsive to a grant of permission for said station to transmit onto said network, for transmitting one or more information frames onto said computer network;
    means for said station to strip frames arriving from said network;
    means to begin stripping of frames detected as arriving from said network upon said grant of permission for said station to transmit onto said network; and,
    means to end said stripping upon expiration of a circulation time interval, said circulation time interval at least as great as said ring latency plus a transmission time interval, said transmission time interval equal to the time period during which said station transmitted said at least one information frame onto said network.

46. The apparatus as in claim 45 further comprising:
    means for transmitting at least one end strip delimiter frame onto said network after transmission of said at least one information frame is finished;
    means for adding to said circulation time interval a time interval during which transmission of said at least one end strip delimiter frame onto said network occurred;
    means for indicating a stripping error in the event that said circulation time interval expires before detection by said station of said end strip delimiter frame.

47. The apparatus as in claim 45, further comprising:
    means for increasing said circulation time interval by a predetermined fraction to allow for variations in said ring latency time, said variations in said ring latency time resulting from variations in the level of network congestion.

48. The apparatus as in claim 45 further comprising:
    means for using an average ring latency for said ring latency, where said average ring latency is computed from the measured ring latency of a predetermined number of frames.

49. The apparatus as in claim 45 further comprising:
    means for transmitting a start strip delimiter frame before beginning transmission of said at least one information frame;
    means for counting said at least one information frame transmitted onto said network, and maintaining a result as a transmission count;
    means, responsive to receipt of said start strip delimiter frame, for starting counting frames stripped from said network, and for maintaining the result as a strip count;
    means for reporting a stripping error in the event that said transmission count is not equal to said strip count at an expiration of said circulation time.

50. The apparatus as in claim 49 further comprising:
    means for maintaining an excess count of frames stripped after said grant of permission for said station to begin transmission onto said network, and ending upon receipt by said station of said start strip delimiter frame.

51. The apparatus as in claim 7, or claim 20, or claim 30, or claim 43, or claim 45, further comprising:
    means for establishing a predetermined time interval;
    means for s tarring a timer; and
    means, in response to expiration of said predetermined time interval by said timer, for ending said stripping.

52. The apparatus as in claim 51 further comprising:
    said computer network is a token ring network: and
    said means for starting said timer starts said timer upon release of a token by said station.

53. The apparatus as in claim 52 further comprising:
    said predetermined time interval is a fixed time interval.

* * * * *